US007697466B2

(12) United States Patent
Hashimoto et al.

(10) Patent No.: US 7,697,466 B2
(45) Date of Patent: Apr. 13, 2010

(54) BASE STATION APPARATUS, MOBILE STATION APPARATUS, RADIO COMMUNICATION SYSTEM, AND RADIO COMMUNICATION METHOD

(75) Inventors: Kazunari Hashimoto, Komatsu (JP); Sadaki Futagi, Ishikawa-gun (JP); Kenichi Miyoshi, Yokohama (JP)

(73) Assignee: Panasonic Corporation, Osaka (JP)

( * ) Notice: Subject to any disclaimer, the term of this patent is extended or adjusted under 35 U.S.C. 154(b) by 1252 days.

(21) Appl. No.: 10/398,484

(22) PCT Filed: Jul. 15, 2002

(86) PCT No.: PCT/JP02/07149

§ 371 (c)(1),
(2), (4) Date: Apr. 4, 2003

(87) PCT Pub. No.: WO03/007646

PCT Pub. Date: Jan. 23, 2003

(65) Prior Publication Data

US 2004/0022176 A1    Feb. 5, 2004

(30) Foreign Application Priority Data

Jul. 13, 2001    (JP)    ............................ 2001-214531

(51) Int. Cl.
*H04B 7/216*    (2006.01)
(52) U.S. Cl. ...................... 370/320; 370/335; 370/342; 370/441; 370/479; 370/500; 375/242; 375/243; 375/244; 375/245; 375/246; 375/247; 375/248; 375/249; 375/250; 375/251; 375/252; 375/253; 375/254; 375/261; 375/269; 375/279; 375/298; 375/308; 375/323; 375/329

(58) Field of Classification Search ................. 370/479, 370/342, 335, 49, 500, 320, 441; 375/268, 375/315, 308, 242–254, 323, 329, 269, 261, 375/279, 298

See application file for complete search history.

(56) References Cited

U.S. PATENT DOCUMENTS 5,867,478 A * 2/1999 Baum et al. .................. 370/203

(Continued)

FOREIGN PATENT DOCUMENTS

EP    0903883    3/1999

(Continued)

OTHER PUBLICATIONS

Korean Office Action dated May 20, 2005 with English translation.

(Continued)

*Primary Examiner*—Aung S Moe
*Assistant Examiner*—Christopher P Grey
(74) *Attorney, Agent, or Firm*—Dickinson Wright PLLC

(57) ABSTRACT

At a base station apparatus, known pilot signals for use in channel estimation are transmitted, and in addition thereto MCS pilot signals that are used to perform adaptive modulations respectively corresponding to a plurality of modulation schemes are multiplexed and output. A mobile station apparatus dispreads the respective MCS signals out of the multiplex signal, compares these to known symbols patterns, and sends the MCS pilot signals that show a matching relationship to the base station apparatus as a mobile station reception result. Upon receiving the mobile station reception result from the mobile station apparatus, the base station apparatus selects the modulation scheme of the optimum modulation level for the downlink signals. This configuration makes it possible to switch the modulation schemes in an accurate and simple way.

9 Claims, 25 Drawing Sheets

U.S. PATENT DOCUMENTS

| | | | | |
|---|---|---|---|---|
| 5,991,308 | A * | 11/1999 | Fuhrmann et al. | 370/395.53 |
| 6,097,714 | A * | 8/2000 | Nagatani et al. | 370/342 |
| 6,167,031 | A | 12/2000 | Olofsson et al. | |
| 6,438,118 | B1 * | 8/2002 | Matui | 370/335 |
| 6,563,807 | B1 * | 5/2003 | Kim et al. | 370/331 |
| 6,584,115 | B1 * | 6/2003 | Suzuki | 370/441 |
| 6,721,834 | B2 * | 4/2004 | Das et al. | 710/117 |
| 6,804,211 | B1 * | 10/2004 | Klein et al. | 370/329 |
| 6,826,169 | B1 * | 11/2004 | Nagatani et al. | 370/342 |
| 6,853,631 | B1 * | 2/2005 | Nakamura et al. | 370/342 |
| 6,907,026 | B2 * | 6/2005 | Akiyama | 370/344 |
| 6,940,915 | B2 * | 9/2005 | Tang | 375/261 |
| 6,996,077 | B1 * | 2/2006 | Suenaga et al. | 370/320 |
| 7,027,420 | B2 * | 4/2006 | Hamalainen | 370/335 |
| 2001/0019550 | A1 * | 9/2001 | Miya | 370/342 |
| 2001/0048711 | A1 * | 12/2001 | Sun et al. | 375/145 |
| 2002/0044540 | A1 * | 4/2002 | Mottier et al. | 370/335 |
| 2002/0058505 | A1 * | 5/2002 | Kim et al. | 455/427 |
| 2002/0176380 | A1 * | 11/2002 | Holtzman et al. | 370/329 |
| 2002/0191568 | A1 * | 12/2002 | Ghosh | 370/335 |

FOREIGN PATENT DOCUMENTS

| | | |
|---|---|---|
| EP | 1054526 | 11/2000 |
| JP | 07250116 | 9/1995 |
| JP | 08274756 | 10/1996 |
| JP | 11234241 | 8/1999 |
| JP | 11355373 | 12/1999 |

OTHER PUBLICATIONS

Supplementary Partial European Search Report dated May 25, 2007.

K. Hamaguchi, et al., "Implementation and Performance of QAM-Level-Controlled Adaptive Modulation for Land Mobile Communications," Electronics Letters, IEE Stevenage, GB, vol. 33, No. 18, XP006007912, pp. 1529-1531, Aug. 28, 1997.

International Search Report dated Oct. 29, 2002.

3G TR V0.1.0 May 2000; 3rd Generation Partnership Project; Technical Specification Group Radio Access Network; Physical Layer Aspects of UTRA High Speed Downlink Packet Access, Release 2000, TSG-RAN Working Group 1 meeting#16, Pusan, Korea, Oct. 10-13, 2000, pp. 13-27.

* cited by examiner

| No. | MODULATION SCHEME | RECEPTION RESULT |
|---|---|---|
| 1 | QPSK | 1 : OK |
| 2 | 8PSK | 1 : OK |
| 3 | 16QAM | 0 : NG |
| 4 | 64QAM | 0 : NG |

| 1 | 2 | 3 | 4 |
|---|---|---|---|
| 1 | 1 | 0 | 0 |

MOBILE STATION RECEPTION RESULT

FIG. 8

| No. | BER (NO ERROR CORRECTION) | | | | MODULATION SCHEME |
| --- | --- | --- | --- | --- | --- |
| | QPSK MODULATION | 8PSK MODULATION | 16QAM MODULATION | 64QAM MODULATION | |
| 1 | $5.4 \times 10^{-4}$ 以下 | $7.7 \times 10^{-4}$ 以下 | $1.1 \times 10^{-3}$ 以下 | $1.9 \times 10^{-3}$ 以下 | 64QAM |
| 2 | $9.0 \times 10^{-4}$ 以下 | $1.1 \times 10^{-3}$ 以下 | $1.9 \times 10^{-3}$ 以下 | $3.2 \times 10^{-3}$ 以下 | 16QAM |
| 3 | $2.5 \times 10^{-3}$ 以下 | $3.6 \times 10^{-3}$ 以下 | $5.4 \times 10^{-3}$ 以下 | $9.0 \times 10^{-3}$ 以下 | 8PSK |
| 4 | others | others | others | others | QPSK |

FIG.16

| No. | BER (NO ERROR CORRECTION) | | | | CODING RATE K | MODULATION SCHEME |
|---|---|---|---|---|---|---|
| | QPSK MODULATION | 8PSK MODULATION | 16QAM MODULATION | 64QAM MODULATION | | |
| 1 | $5.4 \times 10^{-4}$ 以下 | $7.7 \times 10^{-4}$ 以下 | $1.1 \times 10^{-3}$ 以下 | $1.9 \times 10^{-3}$ 以下 | 3/4 | 64QAM |
| 2 | $9.0 \times 10^{-4}$ 以下 | $1.1 \times 10^{-3}$ 以下 | $1.9 \times 10^{-3}$ 以下 | $3.2 \times 10^{-3}$ 以下 | 3/4 | 16QAM |
| 3 | $1.5 \times 10^{-3}$ 以下 | $2.1 \times 10^{-3}$ 以下 | $3.2 \times 10^{-3}$ 以下 | $5.4 \times 10^{-3}$ 以下 | 1/2 | 16QAM |
| 4 | $2.5 \times 10^{-3}$ 以下 | $3.6 \times 10^{-3}$ 以下 | $5.4 \times 10^{-3}$ 以下 | $9.0 \times 10^{-3}$ 以下 | 3/4 | 8PSK |
| 5 | $4.2 \times 10^{-3}$ 以下 | $6.0 \times 10^{-3}$ 以下 | $9.0 \times 10^{-3}$ 以下 | $1.5 \times 10^{-2}$ 以下 | 3/4 | QPSK |
| 6 | $7.0 \times 10^{-3}$ 以下 | $1.0 \times 10^{-2}$ 以下 | $1.5 \times 10^{-2}$ 以下 | $2.5 \times 10^{-2}$ 以下 | 1/2 | QPSK |
| 7 | others | others | others | others | 1/4 | QPSK |

FIG.22

BASE STATION APPARATUS, MOBILE STATION APPARATUS, RADIO COMMUNICATION SYSTEM, AND RADIO COMMUNICATION METHOD

TECHNICAL FIELD

The present invention relates to base station apparatus, mobile station apparatus, wireless communication systems, and wireless communication methods.

BACKGROUND ART

Conventionally, the methods of packet scheduling have been under discussion with adaptive modulation selection methods in relation to HSDPA (High Speed Down-link Packet Access) under 3GPP (3rd Generation Partnership Project: Standardization organization for technical specifications for 3rd generation mobile systems").

A 3GPP technical report, namely "12.3.5 Packet Scheduler" (3GTR V0.1.0), proposes a technique in relation to packet scheduling where signals transmitted and received on wireless channels are seen as packets. According to this method, the CIR (Carrier to Interferer Ratio) or the SIR (Signal to Interferer Ratio) is measured at a mobile station end, and the result is reported to a base station, and at the base station end, the mobile station is assigned its priority in packet transmission based on the scale of the CIR or SIR level. By this priority assignment, after a mobile station with high priority finishes communication, the mobile station of the next priority is able to perform communication.

In addition, the idea of achieving optimum transmission rates by changing the modulation scheme in accordance with measurement results of the CIR level or SIR level is under discussion. By giving priority to communications by those mobile stations of good channel conditions, the overall throughput of the communication system can be enhanced.

Meanwhile, Japanese Laid-Open Patent Application Publication No.HEI8-274756 discloses a prior art technique for changing the transmission symbol rate of the downlink. FIG. 1 shows a configuration of the conventional wireless communication system disclosed in the above publication. Referring to this figure, base station 1 comprises antennas 2 and 9, receiver 3, demodulator 4, signal detector 5, controller 6, modulator 7, and transmitter 8. Mobile station 10 comprises antennas 11 and 18, receiver 12, demodulator 13, estimator 14, controller 15, modulator 16 and transmitter 17.

In base station 1, receiver 3 receives a radio signal transmitted from mobile station 10 and inputs the received signal into demodulator 4. Demodulator 4 demodulates the input signal to the original baseband signal, and inputs this into signal detector 5. From the baseband signal input, signal detector 5 extracts a signal that requests a change of the signal transmission rate (i.e. transmission rate of the downlink signals for when signals are sent from base station 1 to mobile station 10), and then inputs this into controller 6. This signal in request of a change of the signal transmission rate is transmitted from mobile station 10.

In response to the signal transmission rate change request signal extracted in signal detector 5, controller 6 generates a signal transmission rate change signal, and inputs this into modulator 7. Modulator 7 modulates the input, signal transmission rate change signal by a prescribed modulation scheme, and inputs this into transmitter 8. Transmitter 8 amplifies the input, modulation signal and transmits it from antenna 9.

Mobile station 10 receives the signal from base station 1 in receiver 12, which is then demodulated to a baseband signal in demodulator 13. From the baseband signal demodulated in demodulator 13, estimator 14 estimates the propagation path between base station 1 and the mobile station, and inputs the result in controller 15. Based on the input, propagation path estimation result, controller 15 decides whether or not to change the transmission rate of the downlink signals. If a change of the transmission rate is to be made, a change request signal is generated and input into modulator 16. Modulator 16 modulates the input, change request signal and generates the modulation signal, which is then input to transmitter 17. Transmitter 17 amplifies the modulation signal from modulator 16 and transmits it from antenna 18. By the above configuration, the transmission rate of the downlink signals from base station 1 to mobile station 10 is changed.

FIG. 2 is a sequence diagram illustrating the process of changing the transmission rate between mobile station apparatus and base station apparatus under conventional wireless communication system. A unique word (i.e. known pattern) for propagation path estimation is inserted on a given interval in the downlink signals from base station 1 to mobile station 10. Mobile station 10 performs propagation path estimation that estimates the correlation with these unique words. Propagation path estimation utilizes output from a correlator which is not shown and output from a received electric field strength measurer which is not shown. More specifically, the transmission rate is changed taking into account (1) the received electric field strength, (2) I-pattern variance, (3) known pattern detection, and (4) the error rate in the mobile station after reception.

Results of propagation path estimation are reported from mobile station 10 to base station 1 on a regular basis in accordance with the performance of propagation path estimation. Base station 1 receives the propagation path estimation results from mobile station 10 and decides whether or not to change the transmission rate of the downlink signals (i.e. determination for transmission rate variation (42)). If the transmission rate of the downlink signals after the determination result in base station 1 regarding transmission rate change (42) is the same as at present, base station 1 reports only the transmission rate of the downlink signals to mobile station 10 (transmission rate report (43)). If the result of transmission rate variation (42) proves a need to change the transmission rate, base station 1 informs mobile station 10 to the effect that the transmission rate will change and the transmission rate to change to, and the change timing (44).

If a report on the propagation path estimation result (41) from mobile station 10 reaches base station 1 during the time after base station 1 informs mobile station 10 to the effect of a transmission rate change (44) and the signal transmission rate changes, base station 1 dismisses the result (45).

Propagation path estimation is performed on a regular basis in mobile station 10, except immediately after the transmission rate of the downlink signals has changed (46). When a result of propagation path estimation is reported from mobile station 10 after an interval, base station 1 validates this report and determines the transmission rate (42). Then, if the transmission rate proves the same as at present, the transmission rate alone is reported to mobile station 10 (43). When the transmission rate of the downlink signals changes, at this point, mobile station 10 is reported to the effect that the transmission rate will change and the transmission rate to change to, and the change timing (44).

The above prior art provides the following two methods of changing the downlink transmission symbol rate.

(i) Method of FIG. 3

Base station 1 transmits (downlink signals) unique words (known patterns) that are time divided for every prescribed period To and that have varying transmission rates. Mobile station 10 receives the unique words corresponding to the respective To's, determines the maximum receivable transmission rate, and reports the result to base station 1 (uplink). By this means, the transmission rate of the downlink can be set at optimum.

(ii) Method of FIG. 4

During the prescribed period To, base station 1 switches the transmission rate for the transmission rate for the downlink signals from high-speed to low-speed in sequence from prescribed transmission rates. Mobile station 10 performs the parity check of the signals transmitted from base station 1 at rate 4 (rate 4), and, only when they are receivable, reports the transmission rate to base station 1. Upon receiving this report on the transmission rate from mobile station 10, base station 1 switches to this transmission rate. According to this method, reception is at the optimum transmission rate, and this makes it possible to quickly set the fastest transmission rate for the propagation path condition at the time of communication.

Incidentally, the symbol rates of the unique words of varying transmission rates include 10 Msps, 20 Msps, 30 Msps, 40 Msps, 50 Msps, 53.24 Msps, 60 Msps, and 70 Msps.

However, conventional wireless communication systems have the following problems.

(1) Given that there is no one fixed SIR (or CIR) measurement method for individual mobile stations and that the elements that configure the circuit for SIR (or CIR) measurement are inconsistent, a base station is unable to accurately compare the downlink signal reception qualities from the respective mobile stations. Due to this, selecting the modulation scheme in consideration of SIR (CIR) measurement result is mediocre in accuracy, and achieving the communication quality above a certain level is difficult.

(2) The wireless communication system disclosed in Unexamined Japanese Patent Application Publication No.HEI8-274756 changes the symbol rate, so radio bandwidth must always leave some room for when using the optimum speed rate. As a result, when a low-speed rate is selected, the rest of the radio bandwidth becomes a waste (that is, a waste of radio resources).

DISCLOSURE OF THE INVENTION

It is therefore one of the primary objects of the present invention to provide a base station apparatus, a mobile station apparatus, a wireless communication system, and a wireless communication method that can accurately change the modulation scheme without wasting radio resources.

The above object can be achieved where abase station provides each of a number of modulation schemes (e.g. QPSK, 8PSK, 16PSK, 16QAM, 64QAM) with a dedicated pilot signal for adaptive modulation (referred to as MCS (Modulation Coding Scheme) pilot signal in the detailed descriptions of embodiments), and modulation schemes are selected by referring to mobile station reception results, which refer to the determinations as to the receivability of the results of these dedicated pilot signals after reception and modulation in a mobile station.

BRIEF DESCRIPTION OF DRAWINGS

FIG. 8 shows an example of mobile station reception result in mobile station apparatus under the wireless communication system of the first embodiment;

FIG. 16 shows an example of a correspondence table of bit error rates and modulation schemes under the wireless communication system of the second embodiment;

FIG. 22 shows an example of a correspondence table of bit error rates, coding rates, and modulation schemes under the wireless communication system of the fourth embodiment;

BEST MODE FOR CARRYING OUT THE INVENTION

With reference to the accompanying drawings now, best modes for carrying out the present invention will be explained.

Embodiment 1

Figure 1:
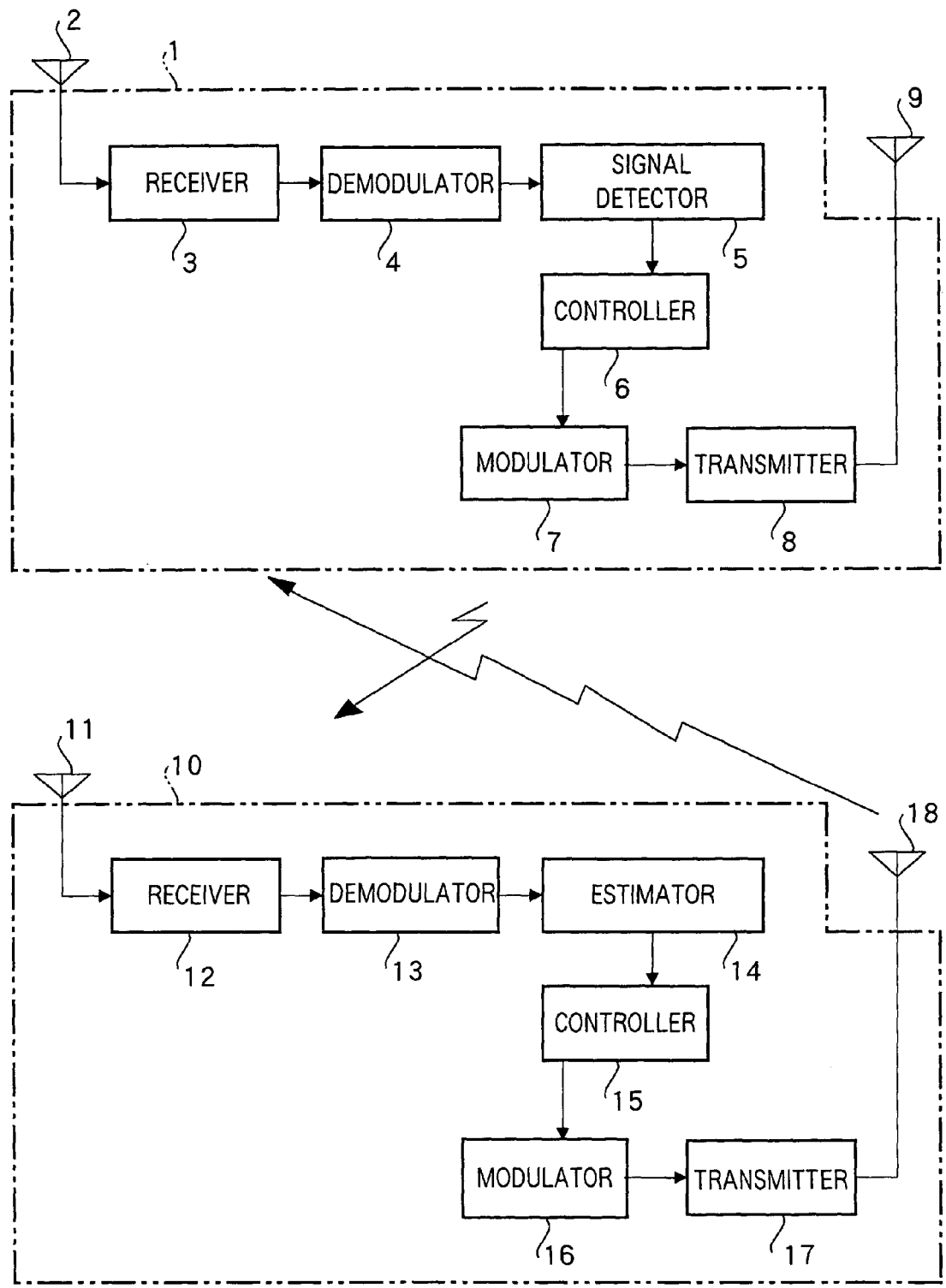
FIG. 1 is a block diagram showing a conventional wireless communication system configuration.
Figure 2:
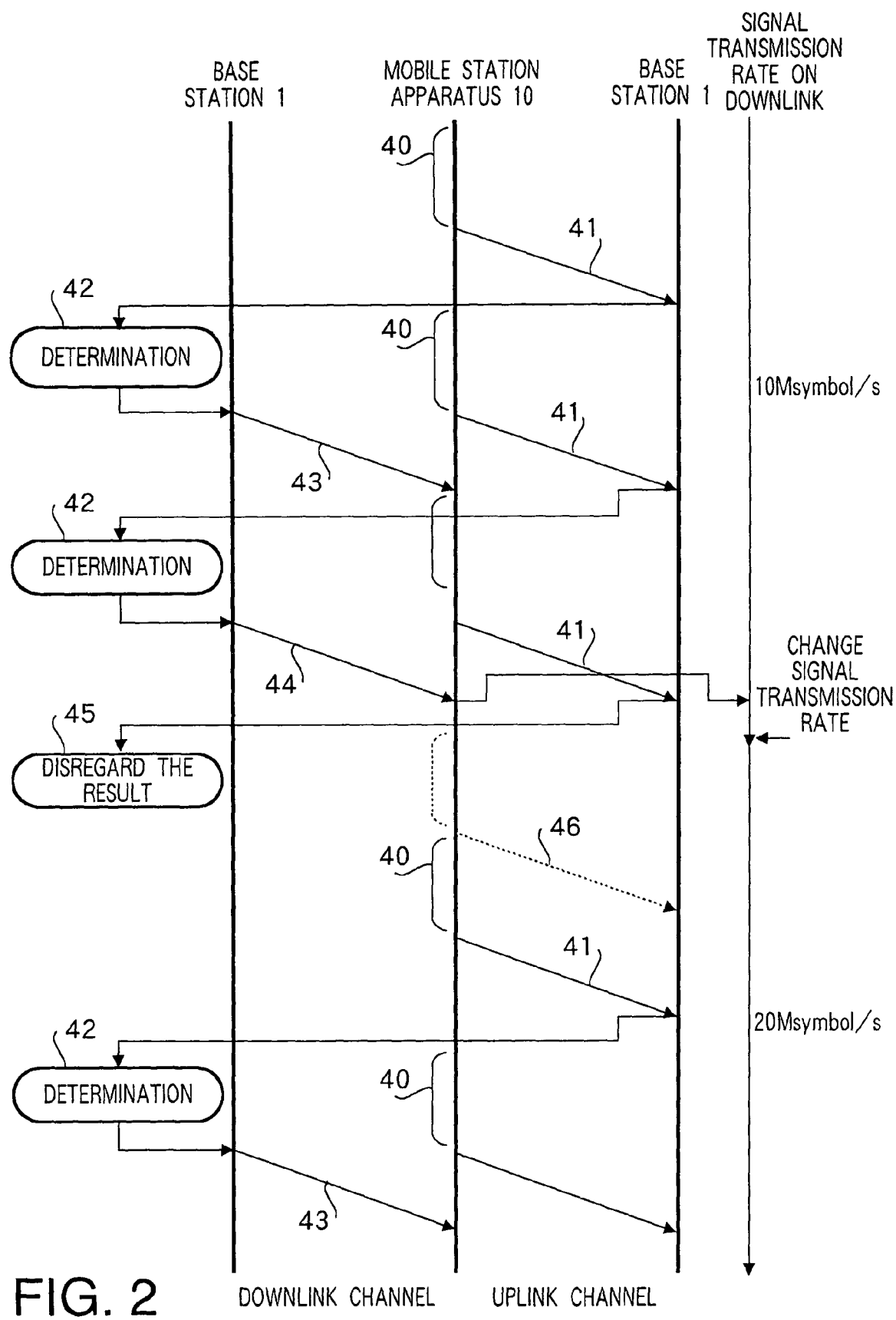
FIG. 2 is a sequence diagram illustrating the process of changing transmission rate between mobile station apparatus and base station apparatus under conventional wireless communication system.
Figure 3:
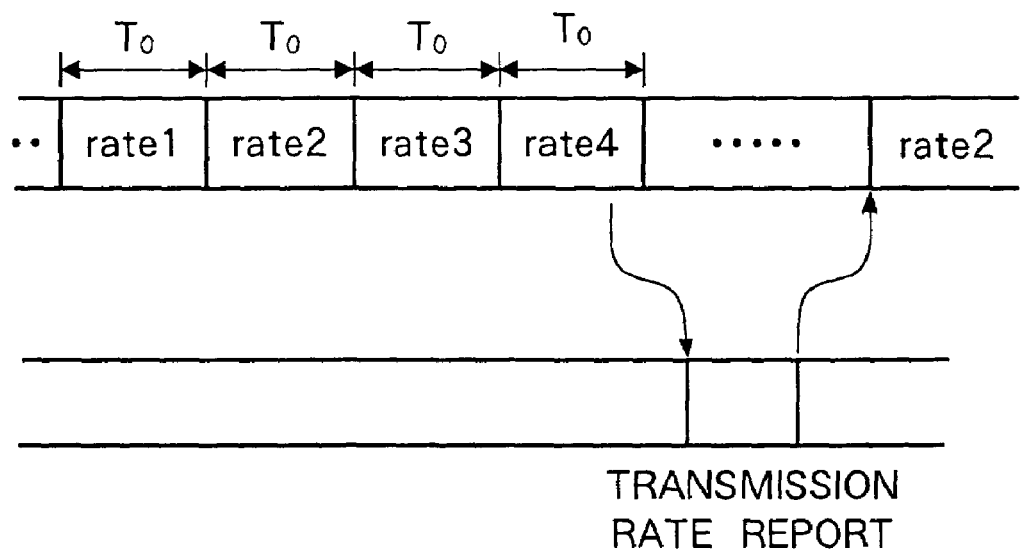
FIG. 3 illustrates a method of changing downlink transmission symbol rate in conventional wireless communication system.
Figure 4:
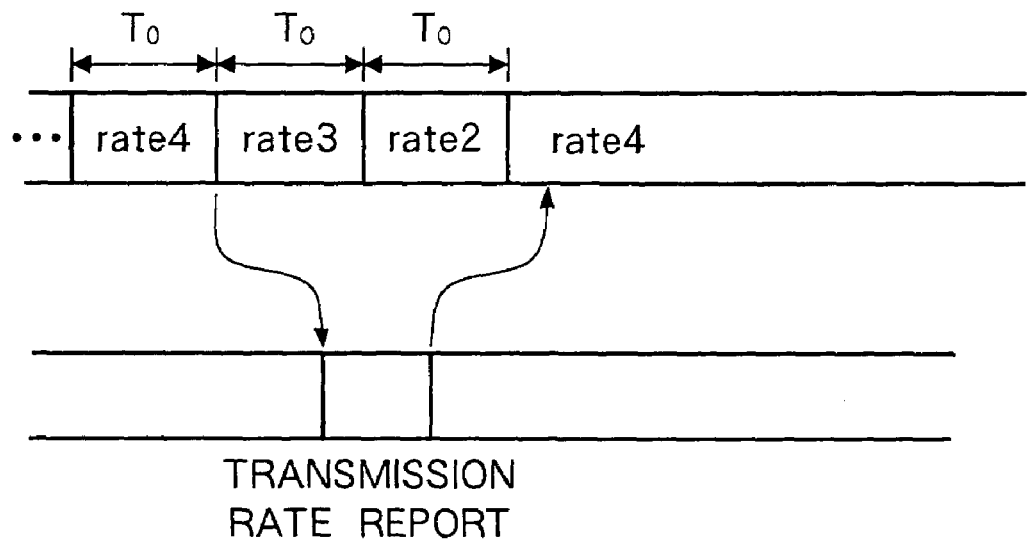
FIG. 4 illustrates a method of changing downlink transmission symbol rate in conventional wireless communication system.
Figure 5:
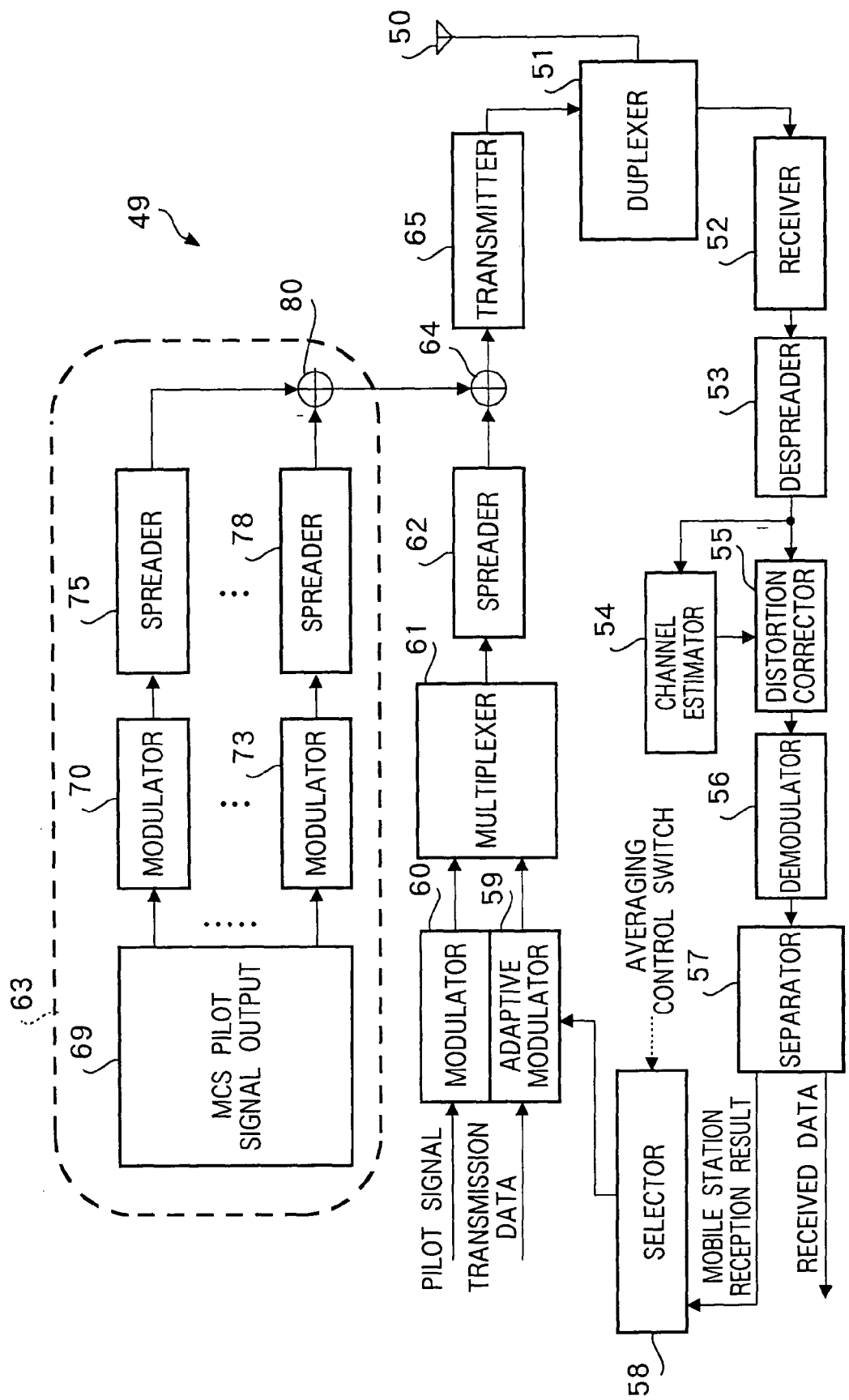
FIG. 5 is a block diagram showing a configuration of base station apparatus under the wireless communication system of the first embodiment of the present invention.
Figure 6:
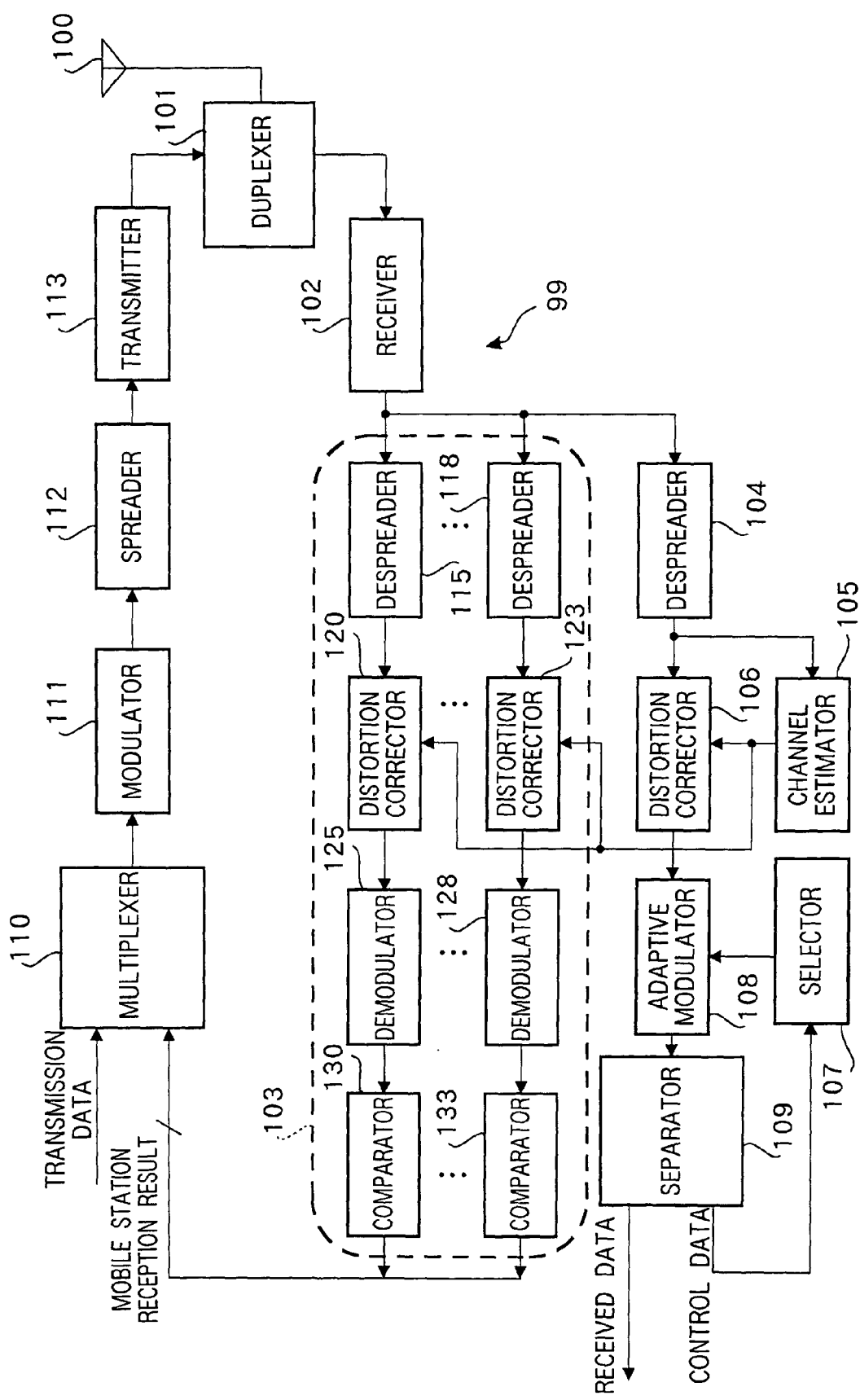
FIG. 6 is a block diagram showing a configuration of mobile station apparatus under the wireless communication system of the first embodiment.

FIG. 5 is a block diagram showing a configuration of base station apparatus under the wireless communication system of the first embodiment of the present invention, and FIG. 6 is a block diagram showing a transmission pattern for MCS pilot channel signals in base station apparatus under the wireless communication system of the first embodiment.

In FIG. 5, base station apparatus 49 comprises antenna 50, duplexer 51, receiver 52, despreader 53, channel estimator 54, distortion corrector 55, demodulator 56, separator 57, selector 58, adaptive modulator 59, modulator 60, multiplexer 61, spreader 62, MCS pilot channel generator 63, adder 64, and transmitter 65.

Duplexer 51 switches antenna 50 between the transmitting side and the receiving side. Receiver 52 receives a radio signal via antenna 50, and inputs the received signal into despreader 53. Despreader 53 dispreads the received signal input from receiver 52 and extracts the first modulation wave, which is then input into channel estimator 54 and distortion corrector 55. With respect to the first modulation wave input from despreader 53, channel estimator 54 estimates the shift (distortion) in IQ component, and inputs the result into distortion corrector 55. Using the channel estimation value input from cannel estimator 54, distortion corrector 55 corrects the distortion on the first modulation wave input from despreader 53, and inputs the corrected first modulation wave into demodulator 56. Demodulator 56 demodulates the distortion-corrected first modulation wave input from distortion corrector 55, and obtains the transmission data from mobile station apparatus 99 (see FIG. 6). The obtained transmission data is input into separator 57. Separator 57 isolates the mobile station reception result (later described in details) and the received data, from the transmission data input from demodulator 56. The mobile station reception result is input into selector 58.

Selector 58 selects a modulation scheme according to the mobile station reception result input from separator 57. That is, based on the result of acknowledgement from mobile station apparatus 99, the modulation scheme of the maximum receivable modulation level is selected. Then, the selected modulation scheme is reported to adaptive modulator 59. Adaptive modulator 59 modulates transmission data by the modulation scheme reported from selector 58. This modulation wave is input into multiplexer 61 as the first modulation wave. In modulator 60, an existing pilot signal for channel estimation is input Modulator 60 modulates, and then inputs this pilot signal into multiplexer 61 as the first modulation wave. Multiplexer 61 multiplexes the first modulation wave input from adaptive modulator 59 and the first modulation wave input from modulator 60, and inputs the multiplex first modulation wave into spreader 62. Using spreading code PN0, spreader 62 performs a second modulation of the multiplex first modulation wave, and generates a second modulation wave.

MCS pilot channel generator 63 comprises MCS pilot signal output 69 from which pilot signals (hereinafter "MCS pilot signals") dedicated to adaptive modulation and correspond respectively to four patterns of modulation schemes (i.e. QPSK, 8PSK, 16QAM, 64QAM) are output together, four modulators 70-73 that modulate the MCS pilot signals that are output from MCS pilot signal output 69 and that correspond to the respective modulation schemes, spreader 75-spreader 78 provided in correspondence with modulator 70-modulator 73, and adder 80 that adds outputs from spreader 75-spreader 78. Incidentally, the respective MCS pilot signals output from MCS pilot signal output 69 can be ones memorized in data form in storage medium such as a memory or can be program-generated.

Modulator 70 modulates the MCS pilot signal that is output from MCS pilot signal output 69 and that corresponds to QPSK. Unshown modulator 71 modulates the MCS pilot signal that is output from MCS pilot signal output 69 and that corresponds to 8PSK. Unshown modulator 72 modulates the MCS pilot signal that is output from MCS pilot signal output 69 and that corresponds to 16QAM. Modulator 73 modulates the MCS pilot signal that is output from MCS pilot signal output 69 and that corresponds to 64QAM.

Using spreading code PN1, spreader 75 spreads the modulation wave signal output from modulator 70. Using spreading code PN2, unshown spreader 76 spreads the modulation wave signal output from unshown modulator 71. Using spreading code PN3, unshown spreader 77 spreads the modulation wave signal output from unshown modulator 72. Using spreading code PN4, spreader 78 spreads the modulation wave signal output from modulator 73.

Adder 80 adds the modulation waves from spreader 75-spreader 78. Adder 64 adds the modulation wave from adder 80 and the second modulation wave signal from spreader 62. The added-up modulation wave signal from adder 64 is input into transmitter 65. Transmitter 65 up-converts the input modulation wave signal to a given radio frequency, which is then power-amplified to a given level and transmitted from antenna 50 via duplexer 51.

Figure 7:
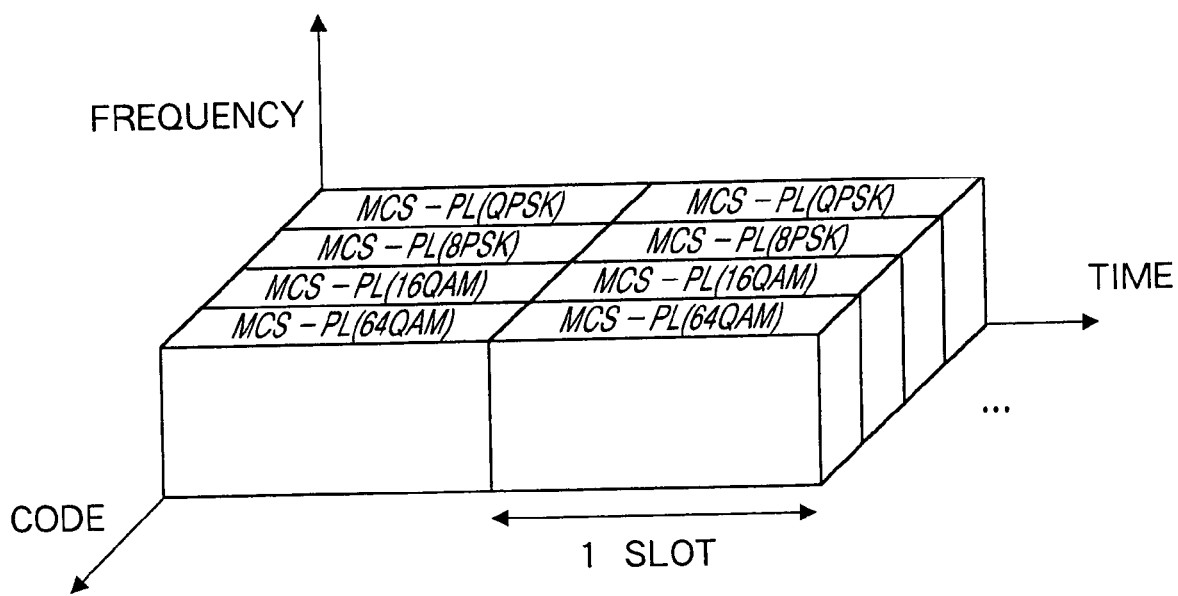
FIG. 7 is a block diagram showing a transmission pattern for MCS pilot channel signals in base station apparatus under the wireless communication system of the first embodiment.

Now, FIG. 7 is a conceptual diagram of a transmission pattern for MCS pilot channel signals. As shown in this figure, for each of QPSK, 8PSK, 16QAM, and 64QAM, MCS pilot signals are code-multiplexed.

Next, in FIG. 6, mobile station apparatus 99 comprises antenna 100, duplexer 101, receiver 102, MCS pilot channel modulator 103, despreader 104, channel estimator 105, distortion corrector 106, selector 107, adaptive modulator 108, separator 109, multiplexer 109, modulator 111, spreader 112, and transmitter 113. Duplexer 101 switches antenna 100 between the transmitting side and the receiving side. Receiver 102 receives a radio signal via antenna 100. MCS pilot channel modulator 103 comprises despreader 115-despreader 118, distortion corrector 120-distortion corrector 123, modulator 125-modulator 128, and comparator 130 comparator 133, and modulates, from the received signal, MCS pilot signals that correspond to respective modulation schemes, draws a comparison between the modulated MCS pilot signals and known symbol patterns provided in correspondence with the respective MCS pilot signals, and outputs the comparison result (called "mobile station reception result") in either "match" or "nonmatch."

Using spreading code PN1, despreader 115 extracts one of the code multiplexed signals out of the received signal from receiver 102. Using spreading code PN2, unshown despreader 116 extracts one of the code multiplexed signals out of the received signal from receiver 102. Using spreading code PN3, unshown despreader 117 extracts one of the code multiplexed signals out of the received signal from receiver 102. Using spreading code PN4, despreader 118 extracts one of the code multiplexed signals out of the received signal from receiver 102.

Using the channel estimation value estimated in channel estimator 105, distortion corrector 120 performs the distortion correction of the signal extracted by despreader 115. Using the channel estimation value estimated in channel estimator 105, unshown distortion corrector 121 performs the distortion correction of the signal extracted by unshown despreader 116. Using the channel estimation value estimated in channel estimator 105, unshown distortion corrector 122 performs the distortion correction of the signal extracted by unshown despreader 117. Using the channel estimation value estimated in channel estimator 105, unshown distortion corrector 123 performs the distortion correction of the signal extracted by despreader 118.

Demodulator 125 demodulates the MCS pilot signal corresponding to QPSK from the despread signal subjected to distortion correction in distortion corrector 120. Unshown demodulator 126 demodulates the MCS pilot signal corresponding to 8PSK from the despread signal subjected to distortion correction in unshown distortion corrector 121. Unshown demodulator 127 demodulates the MCS pilot signal corresponding to 16QAM from the despread signal subjected to distortion correction in unshown distortion corrector 122. Demodulator 128 demodulates the MCS pilot signal corresponding to 64QAM from the despread signal subjected to distortion correction in distortion corrector 123.

Comparator 130 has a known symbol pattern that accords with the MCS pilot signal corresponding to QPSK, and draws a comparison between this known symbol pattern and the MCS pilot signal that was demodulated in demodulator 125 and that corresponds to QPSK, and determines their match/nonmatch. Unshown comparator 131 has a known symbol pattern that accords with the MCS pilot signal corresponding to 8PSK, and draws a comparison between this known symbol pattern and the MCS pilot signal that was demodulated in unshown demodulator 126 and that corresponds to 8PSK, and determines their match/nonmatch. Unshown comparator 132 has a known symbol pattern that accords with the MCS pilot signal corresponding to 16QAM, and draws a comparison between this known symbol pattern and the MCS pilot signal that was demodulated in unshown demodulator 127 and that corresponds to 16QAM, and determines their match/nonmatch. Comparator 133 has a known symbol pattern that accords with the MCS pilot signal corresponding to 64QAM, and draws a comparison between this known symbol pattern and the MCS pilot signal that was demodulated in demodulator 128 and that corresponds to 64QAM and determines their match/nonmatch. In the respective comparisons between the known symbol patterns in comparator 130-comparator 133 and the MCS pilot signals, "1" is output upon match, and "0" is output upon nonmatch.

The comparison results from comparator 130-comparator 133 are reported to base station apparatus 49 as the above-described mobile station reception result. Now, FIG. 8 shows an example of mobile station reception result. In this figure, QPSK and 8PSK show a match between the MCS pilot signal and known symbol pattern, while in 16QAM and 64QAM, the MCS pilot signal and known symbol pattern do not match. The reception result is "1" (OK) in QPSK and 8PSK, and in 16QAM and 64QAM, the reception result is "0" (NG). Incidentally, although this will be described later, base station 49, upon receiving the mobile station reception result, selects the modulation scheme of the maximum receivable modulation level, which is 8PSK in the example of FIG. 8, and reports the result (that is, the modulation scheme to switch to, and the timing to switch) to mobile station apparatus 99.

Now returning to FIG. 6, using spreading code PN0, despreader 104 dispreads the baseband received data and extracts the received information, which is then input into channel estimator 105 and distortion corrector 106. Based on the received information input from despreader 104, channel estimator 105 estimates the shift (distortion) in IQ component, and inputs the result into each of distortion corrector 106 and distortion corrector 120-distortion corrector 123 of MCS pilot channel modulator 103. Distortion corrector 106 performs the distortion correction of the received information from despreader 104 using the channel estimation value input from channel estimator 105. The distortion-corrected received information is input into adaptive demodulator 108. Adaptive demodulator 108 demodulates the distortion-corrected received information using the demodulation scheme selected in selector 107, and obtains the transmission data sent from base station apparatus 49. Then, the obtained transmission data is input into separator 109. Separator 109 isolates the received data and the control data from the transmission data input from adaptive demodulator 108. The control data here contains information that specifies the modulation scheme. This isolated control data is input into selector 107.

Figure 9:
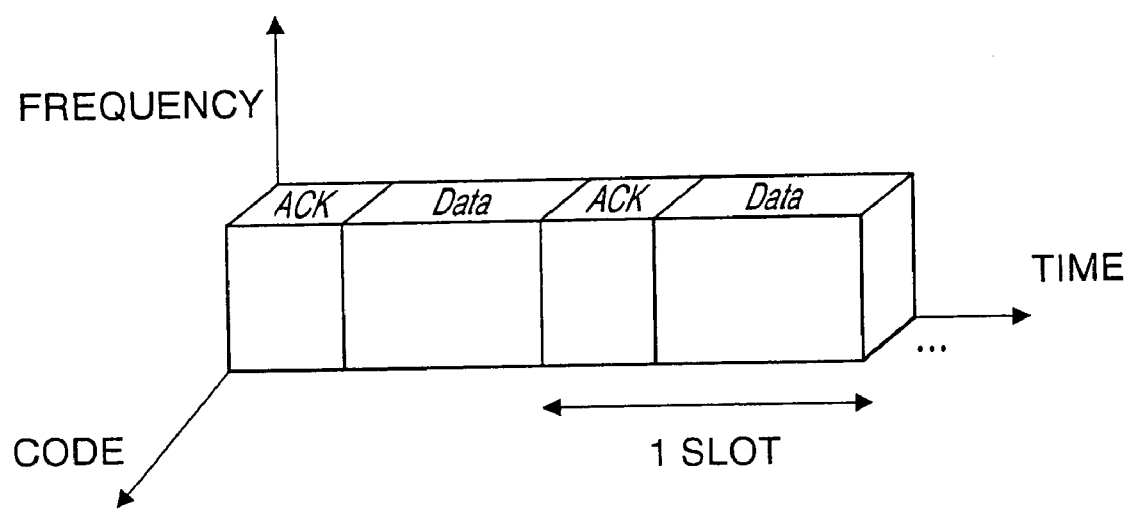
FIG. 9 is a conceptual diagram of transmission pattern for mobile station reception result in mobile station apparatus under the wireless communication system of the first embodiment.

Selector 107 selects the demodulation scheme based on the control data input from separator 109. That is, the demodulation scheme is selected based on the result of acknowledgement from base station apparatus 49 (acknowledgement of the above-described mobile station reception result), and the selected demodulation scheme is reported to adaptive demodulator 108. Multiplexer 110 multiplexes the transmission data that is to be sent to base station apparatus 49 with the comparison results (i.e. mobile station reception results) from comparator 130-comparator 134 of MCS pilot channel demodulator 103, and inputs these into modulator 111. FIG. 9 shows an example of multiplexed mobile station reception result. Although the figure shows multiplexing in the time-axis direction, it is still possible to perform IQ multiplex with communication data and ACK (Acknowledgment) data.

Returning to FIG. 6, modulator 111 performs the first modulation of the multiplex data input from multiplexer 110, and inputs the first modulation wave into spreader 112. Using spreading code PN0, spreader 112 performs a second modulation of the first modulation wave input from modulator 11. Transmitter 113 up-converts the second modulation wave from spreader 112, which is then power-amplified to a given level and transmitted as a radio signal from antenna 100 via duplexer 101.

Next, with reference to FIG. 10-FIG. 12, the operation for switching the modulation scheme of base station apparatus 49 and mobile station apparatus 99 will be described.

Figure 10:
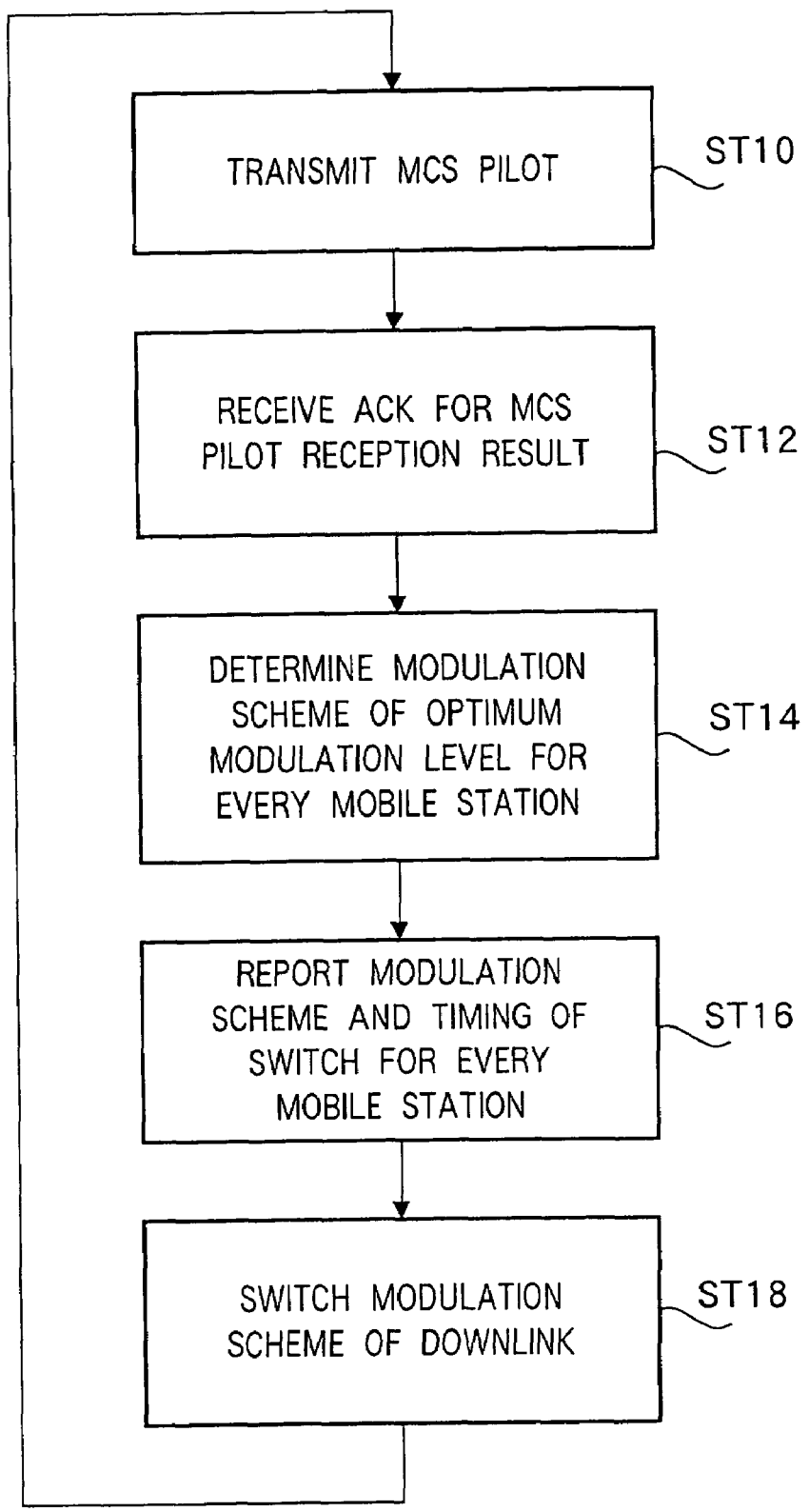
FIG. 10 is a flow chart of the operation of switching modulation scheme in base station apparatus under the wireless communication system of the first embodiment.

FIG. 10 shows a flow chart of the operation of changing the modulation scheme in base station 49. In this figure, first, MCS pilot signals that respectively correspond to the modulation schemes of QPSK, 8PSK, 16QAM, and 64QAM are code-multiplexed and transmitted (ST10). When an ACK is received (ST12) in response to mobile station reception result from mobile station apparatus 99 (although there are cases where there is only one unit, usually there are several) after the code-multiplexed MCS pilot signals corresponding to the respective modulation schemes have been sent out, according to this mobile station reception result, the modulation scheme of the maximum receivable modulation level is selected for every mobile station apparatus 99 (ST14). Incidentally, it is possible to use one slot of ACK signal from each mobile station apparatus 99 as a parameter in the modulation scheme selection for every mobile station apparatus 99. It is also possible to use the average ACK signal of several slots as a parameter. In this case, the signal noted as "AVERAGING CONTROL SWITCH" (which is input into selector 58 of base station apparatus 49) in FIG. 5 indicates the average of several slots. When the "AVERAGING CONTROL SWITCH" signal is input, selector 58 averages several slots of ACK signals from mobile station apparatus 99. Then, with the average ACK signal serving as a parameter, the modulation scheme is selected.

Returning to FIG. 10, base station apparatus 49 selects the modulation scheme of the optimum modulation level for every mobile station apparatus in ST 14, and thereafter reports the modulation scheme and the timing of switch (ST 16) After this report, the modulation scheme for the downlink signals switches by the specified timing (ST 18).

Figure 11:
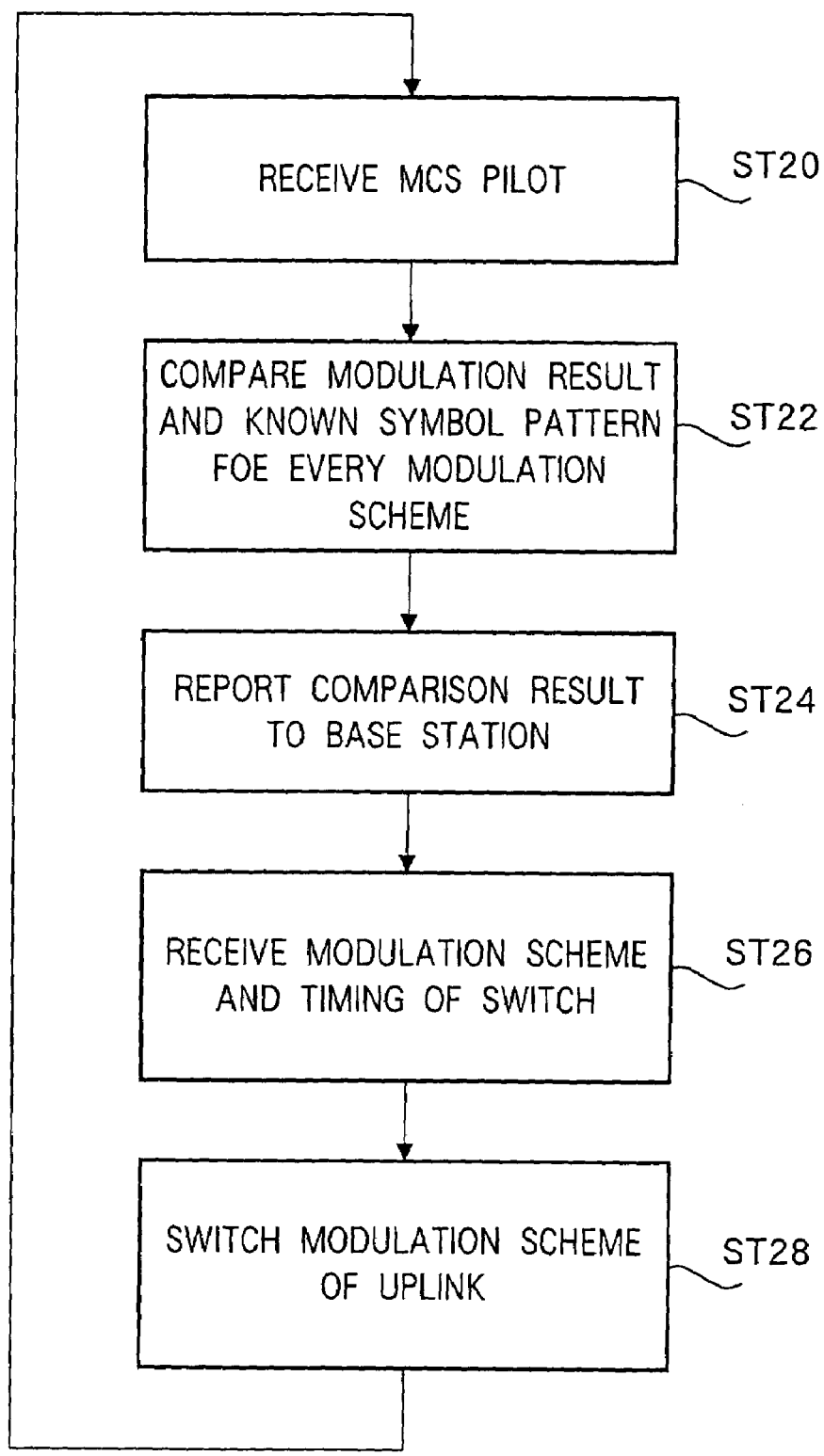
FIG. 11 is a flow chart of the operation of switching modulation scheme in mobile station apparatus under the wireless communication system of the first embodiment.

Next, FIG. 11 shows a flow chart of the operation of switching the modulation scheme of mobile station apparatus 99. Referring to the figure, a code-multiplexed MCS pilot signal transmitted from base station apparatus 49 is received (ST 20). After the code multiplexed MCS pilot signal is received, a comparison is drawn between the demodulation results of the MCS pilot signals and known symbol patterns corresponding to the respective modulation scheme (ST 22). After this comparison, the mobile station reception result is reported to base station apparatus 49 (ST 24). Thereafter, when the modulation scheme and the timing of switch are specified by base station apparatus 49 (ST 26), the demodulation scheme switches to the specified one by the specified timing (ST 28).

Figure 12:
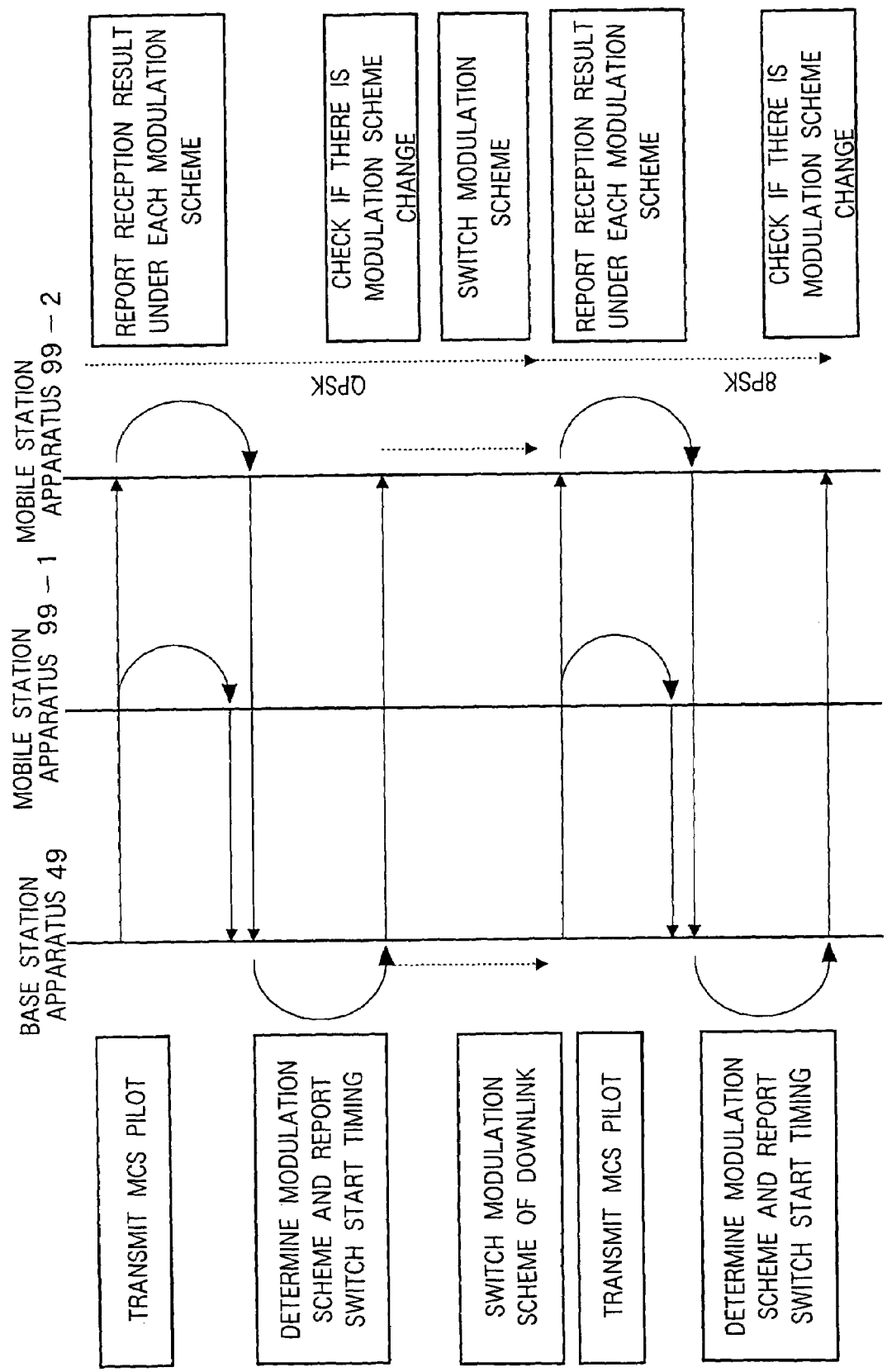
FIG. 12 is a sequence diagram showing the process of changing transmission rate between wireless communication apparatus and base station apparatus under the wireless communication system of the first embodiment.

Next, FIG. 12 is a sequence diagram showing the process of switching the transmission rate between base station apparatus 49 and two mobile station apparatus 99-1 and mobile station apparatus 99-2.

When mobile station apparatus 99-1 and mobile station apparatus 99-2 receive the code-multiplexed MCS pilot signal transmitted from base station apparatus 49, mobile station apparatus 99-1 and mobile station apparatus 99-2 draw a comparison with a known symbol pattern for every modulation scheme's MCS pilot signal, and the MCS pilot signal that show a match is reported to base station apparatus 49 as a mobile station reception result. Assume that in this context the initial modulation scheme in mobile station apparatus 99-1 and mobile station apparatus 99-2 is QPSK.

Base station apparatus 49 receives the reception result report from mobile station apparatus 99-1 and mobile station apparatus 99-2, and, according to the condition of reception in mobile station apparatus 99-1 and mobile station apparatus 99-2, selects a modulation scheme for each. Then, the selected modulation schemes and switch-start timings are reported to mobile station apparatus 99-1 and mobile station apparatus 99-2. When the report is made from base station apparatus 49, mobile station apparatus 99-1 and mobile station apparatus 99-2 check the presence/absence of a modulation scheme change.

Base station apparatus 49 switches the modulation scheme by the switch-start timing reported to mobile station apparatus 99-1 and mobile station apparatus 99-2. In addition, by the same switch timing, mobile station apparatus 99-1 and mobile station apparatus 99-2 switch the modulation scheme. If, for instance, the modulation scheme of the maximum receivable modulation value for mobile station apparatus 99-1 and mobile station apparatus 99-2 is 8PSK according to the reception result report from mobile station apparatus 99-1 and mobile station apparatus 99-2, the current QPSK switches to 8PSK. After switching the modulation scheme, base station apparatus 49 once again transmits MCS pilot signals that correspond to the respective modulation schemes, and performs the same processing as described above in relationship to mobile station apparatus 99-1 and mobile station apparatus 99-2.

On the other hand, when there is no need to switch the current modulation scheme, the MCS pilot signals are transmitted by the same timing as the switch start timing. That is, the MCS pilot signals are transmitted on a given interval to decide whether there is a need to switch the modulation scheme, which, if a change is needed, switches to new modulation schemes. If there is no need for such change, the current modulation scheme is sustained until next MCS pilot signals are transmitted.

As described above, according to the wireless communication system of the present embodiment, base station apparatus 49, in addition to transmitting known pilot signals used for channel estimation, transmits dedicated MCS pilot signals for performing adaptive modulation in accordance with each of several modulation schemes (e.g. QPSK, 8PSK, 16QAM, 64QAM). From a received signal, mobile station apparatus 99 extracts each of the code-multiplexed MCS pilot signals through despreading, compares each with a known symbol pattern, and, if there is an MCS pilot signal that shows a match, reports this as a mobile station reception result to base station apparatus 49. Upon receiving the report of mobile station reception result from mobile station apparatus 99, base station apparatus 49 selects the modulation scheme of the optimum modulation level for the downlink signals from the modulation schemes corresponding to the MCS pilot signals that show a match with known symbol patterns, and reports the selected modulation scheme to mobile station apparatus 99 and meanwhile performs communication with mobile station apparatus 99 by this modulation scheme.

Thus, the modulation scheme is selected based on the mobile station reception result, which refers to determinations as to the result of a dedicated MCS pilot signal received and demodulated in mobile station apparatus 99 is receivable, thereby enabling more accurate modulation scheme selection than modulation scheme selection using SIR (CIR) measurement results and improving channel quality. Moreover, unlike the methods that change the symbol rate, radio resources are not wasted.

Although Embodiment 1 above is configured such that MCS pilot signals are transmitted on a per slot basis at the same power level, such configuration is also possible where transmission is first performed at a low power level and then at gradually higher power levels.

Figure 13:
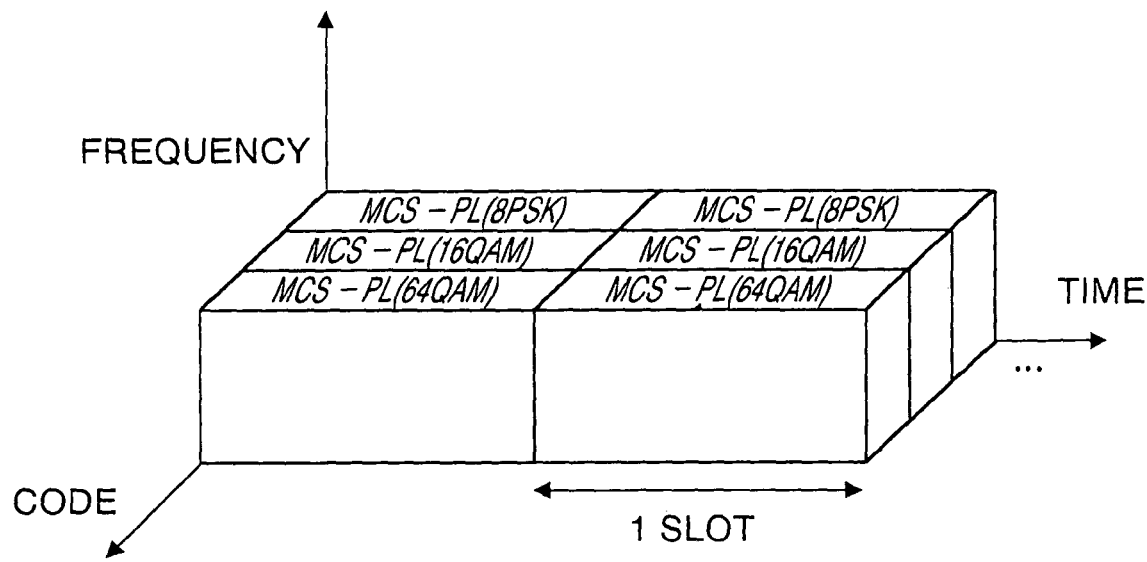
FIG. 13 is a conceptual diagram showing a variation of the transmission pattern for MCS pilot channel signals shown in FIG. 6.

In addition, according to Embodiment 1 above, since base station apparatus 49 code-multiplexes and transmits MCS pilot signals corresponding to all of the modulation schemes QPSK, 8PSK, 16QAM, and 64QAM, some interference between codes cannot be helped. However, as shown in FIG. 13, by making no transmission in relationship to QPSK, which corresponds to the smallest modulation level, inter-code interference can be reduced by that proportion.

Figure 14:
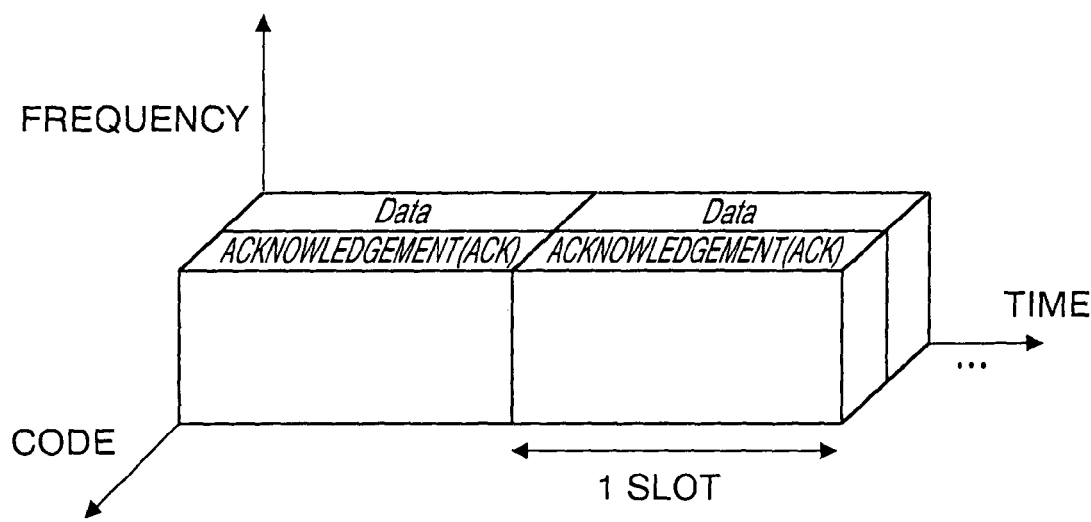
FIG. 14 is a conceptual diagram showing a variation of the transmission pattern for mobile station reception result shown in FIG. 9.

Moreover, although Embodiment 1 above is configured such that ACK's from mobile station apparatus are multiplexed in the time axis direction as shown in FIG. 9, multiplexing in the code direction is also possible as shown in FIG. 14. This allows a slot to transmit a greater volume of transmission data comparing to the case of multiplexing in the time axis direction.

Furthermore, although Embodiment 1 above provides four types of modulation schemes, namely PSK, 8PSK, 16QAM, and 64QAM, other modulation schemes (e.g. 16PSK) can certainly be added.

Embodiment 2

Figure 15:
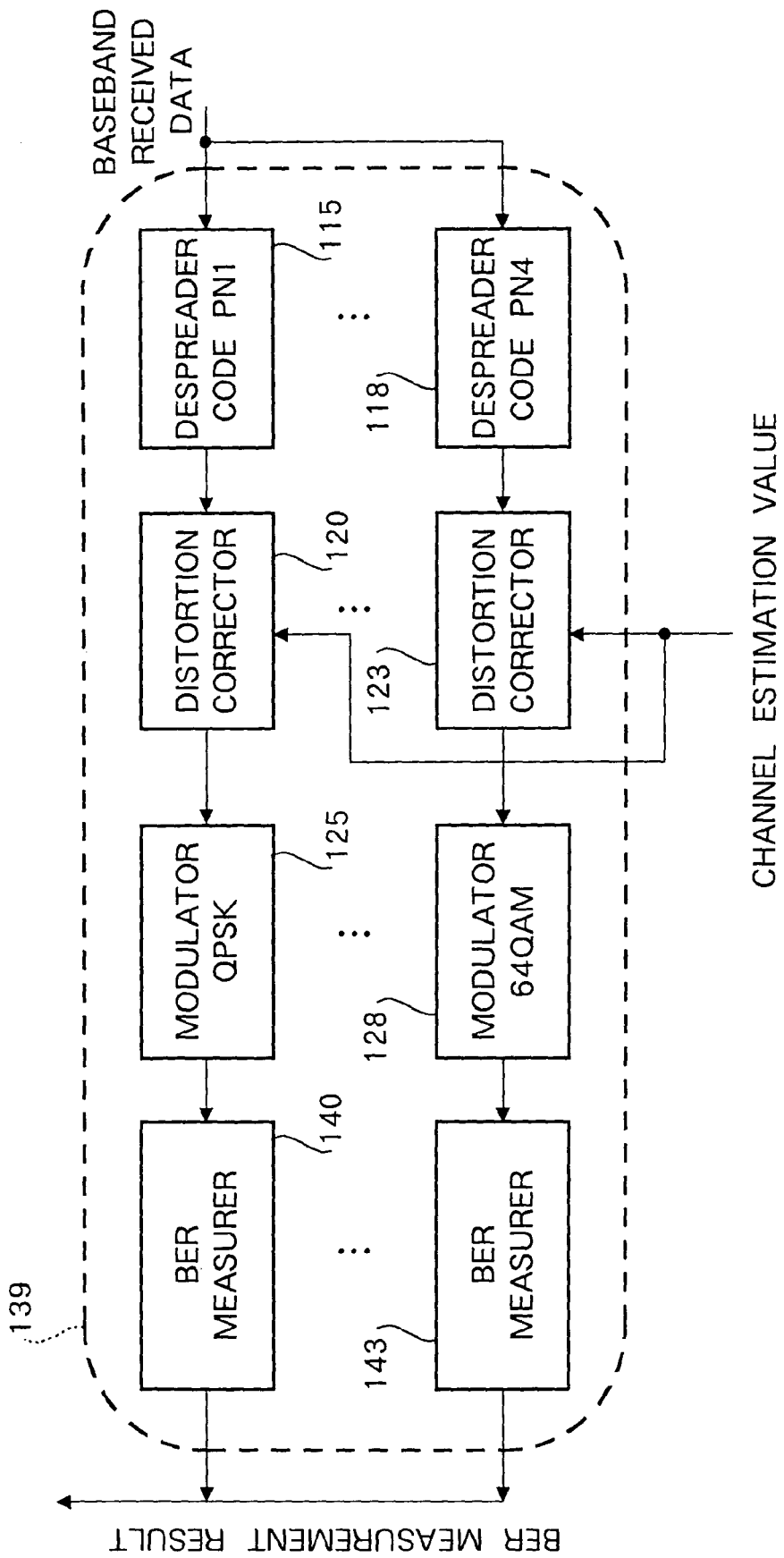
FIG. 15 is a block diagram showing a configuration of MCS pilot channel demodulator in mobile station apparatus under the wireless communication system of the second embodiment of the present invention.

FIG. 15 is a block diagram showing a configuration of an MCS pilot channel demodulator 139 in mobile station apparatus under the wireless communication system of the second embodiment of the present invention. Parts in this figure identical to those in MCS pilot channel demodulator 103 of FIG. 6 are assigned the same numerals without further explanations. In addition, since parts besides MCS pilot channel demodulator 139 are identical, reference will be made to FIG. 6 as it is. Moreover, as for the numerals assigned to the base station apparatus and the mobile station terminal apparatus, these will be "49" for the base station apparatus and "99" for the mobile station apparatus, as in Embodiment 1.

As shown in FIG. 15, mobile station apparatus 99 of the present embodiment comprises MCS pilot channel demodulator 139 that further comprises BER measurer 140-BER measurer 143 that obtains the number of errors or the bit rate from output of each of demodulator 125-demodulator 128. Mobile station apparatus 99 reports the results measured in BER measurer 140-BER measurer 143, that is, BER measurement results, to base station apparatus 49. In this case, BER measurer 140-BER measurer 143 draw a comparison between received data demodulated by respective demodulation schemes and known signal patterns, count the number of bit errors (bit error number) and output the result. The count value is transmitted with transmission data as the mobile station reception result to base station apparatus 49.

Using the bit error number reported from mobile station apparatus 99 as a parameter, base station apparatus 49 selects the modulation scheme for the downlink signals. Incidentally, it is also possible to divide the number of bit errors by the number of transmission bits, and obtain the error rate in mobile station apparatus 99 or base station apparatus 49 and use it as a parameter. For instance, when selecting the modulation scheme on the basis of bit error rate, base station apparatus 49 receives a report on the number of bit errors as an acknowledgement result from mobile station apparatus 99, and thereupon performs the calculation of dividing the bit error number by the transmission bit number, and obtains the bit error rate. Then, from the obtained bit error rate, the modulation scheme is selected with reference to a table of prescribed corresponding bit error rates and modulation schemes (see in FIG. 16 an example of a table of corresponding bit error rates and modulation schemes). Then, the selected modulation scheme and the timing to perform the change are reported to mobile station apparatus 99. Upon receiving this report, mobile station apparatus 99 switches to the specified modulation scheme by the above switch timing.

Now assume a case where the bit error rates obtained in base station apparatus 49 corresponding to the respective modulation schemes based on the mobile station reception result from mobile station apparatus 99 are:

$QPSK=1.5\times10^{-3}$ $8PSK=4.0\times10^{-3}$ $16QAM=1.5\times10^{-2}$ $64QAM=2.0\times10^{-1}$ Referring to the table of FIG. 16, QPSK alone has a satisfactory bit error rate, and accordingly the modulation scheme switches to 8PSK.

As described above, according to the present embodiment, mobile station apparatus 99 obtains the numbers of bit errors from the demodulation result of the MCS pilot signals and sends the result to base station apparatus 49. Base station apparatus 49 obtains the bit error rates based on the bit error numbers from mobile station apparatus 99, and the modulation scheme for the downlink signals is selected according to the obtained bit error rates. As a result, as in Embodiment 1, more accurate modulation scheme selection than modulation scheme selection using SIR (CIR) measurement results is made possible for improved channel quality. Moreover, unlike the methods that change the symbol rate, radio resources are not wasted. More notably, the present embodiment is configured such that the modulation scheme for the downlink signals is selected on the basis of bit error rate, so that more delicate modulation scheme selection control that is in accordance with reception performance (decoding performance) of a mobile station is made possible, compared to cases where the modulation scheme is selected on the determination basis of an either-or nature such as whether the pilot patterns match or do not match, or whether a CRC result is good or poor.

Furthermore, although the present embodiment is configured such that the optimum modulation scheme is selected based on the bit error rates of several MCS pilot signals corresponding to the respective modulation schemes, such configuration is also possible where focus is upon MCS pilot signals using minimum one modulation scheme, in order to simplify the process of the above. Focusing on QPSK, for instance, when the bit error rate is $6.5\times10^{-4}$, this falls below $9.0\times10^{-4}$ according to the table of FIG. 16, and so 16QAM is selected. By thus looking at only one MCS pilot signal utilizing a modulation scheme, the process can be simplified and the number of MCS pilot transmission patterns can be reduced, for simplified transmission circuit and reduced inter-code interference.

Embodiment 3

Figure 17:
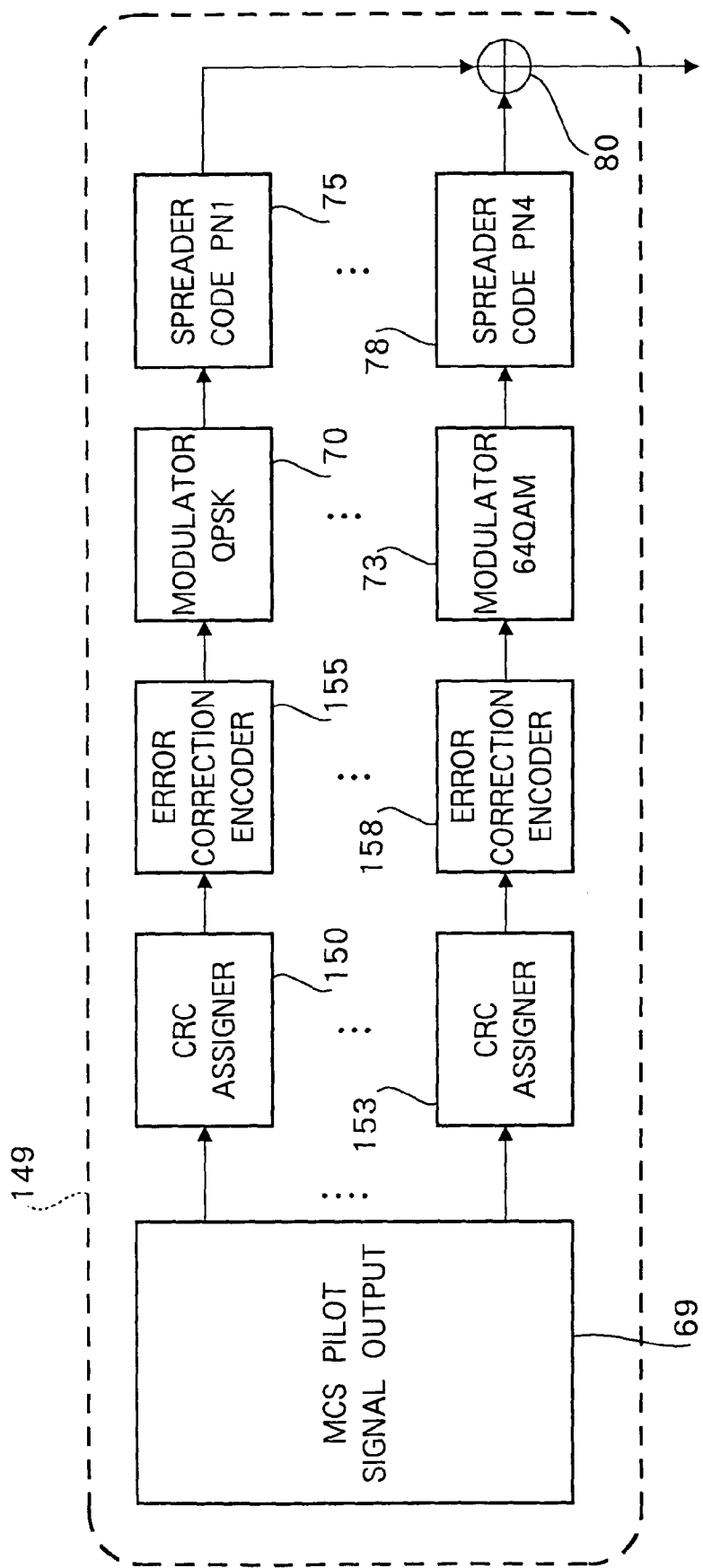
FIG. 17 is a block diagram showing a configuration of MCS pilot channel generator in base station apparatus under the wireless communication system of the third embodiment of the present invention.
Figure 18:
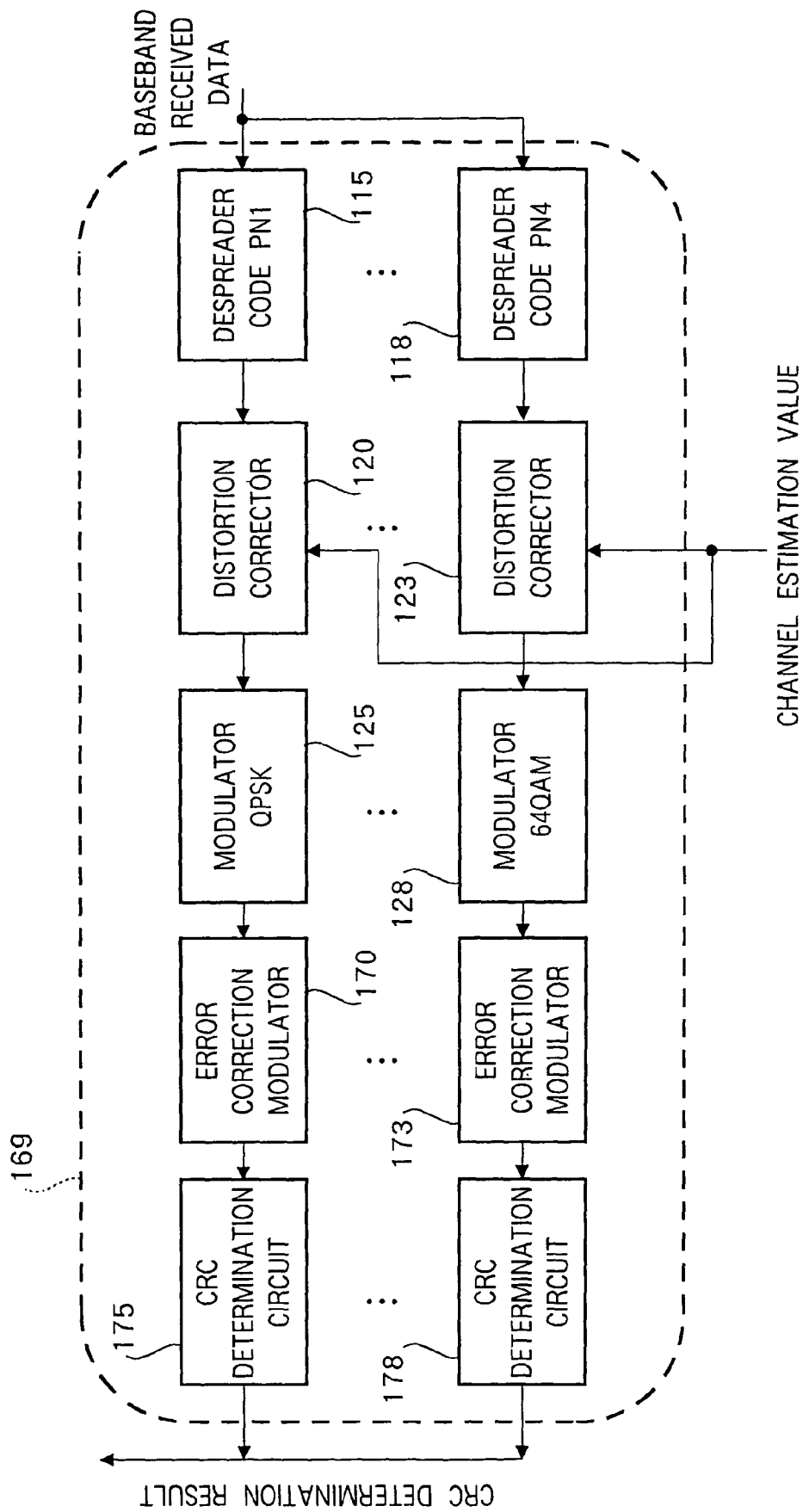
FIG. 18 is a block diagram showing a configuration of MCS pilot channel demodulator in mobile station apparatus under the wireless communication system of the third embodiment.

FIG. 17 is a block diagram showing a configuration of an MCS pilot channel generator 149 in base station apparatus under the wireless communication system of the third embodiment of the present invention. FIG. 18 is a block diagram showing a configuration of an MCS pilot channel demodulator 169 in mobile station apparatus under the wireless communication system of the third embodiment. In these figures, parts identical between MCS pilot channel generator 63 of the aforementioned FIG. 5 and MCS pilot channel demodulator 103 of FIG. 6 are assigned the same numerals without further explanations. As for parts besides MCS pilot channel generator 63, reference will be made to FIG. 5. Similarly, reference will be made to FIG. 6 regarding those parts besides MCS pilot channel demodulator 103. Moreover, as for the numerals assigned to the base station apparatus and the mobile station terminal apparatus, these will be "49" for the base station apparatus and "99" for the mobile station apparatus, as in Embodiment 1.

Figure 19:
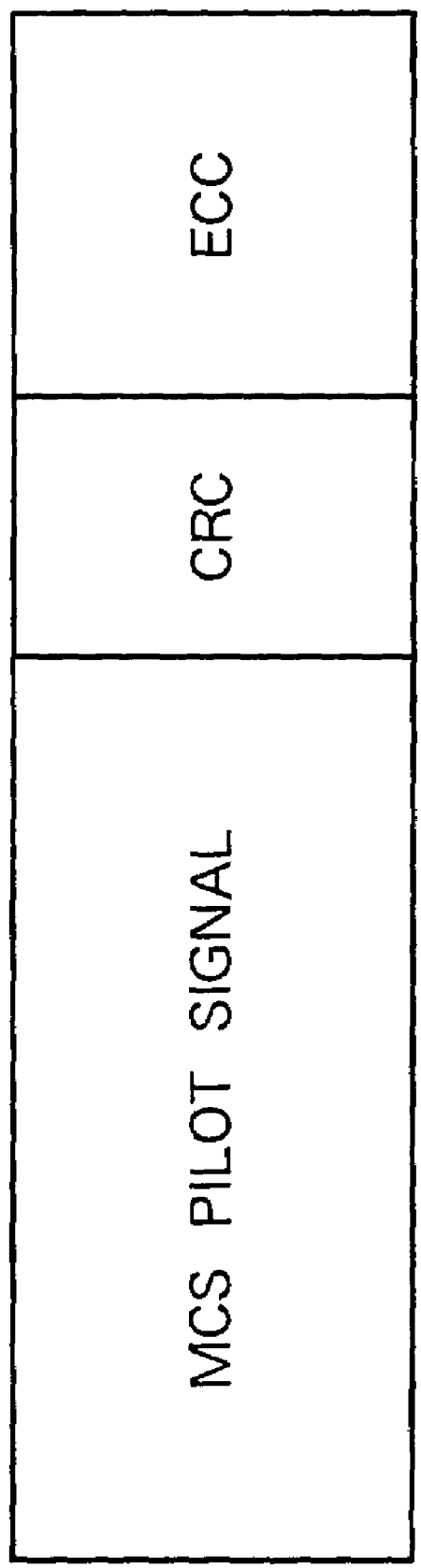
FIG. 19 shows a transmission format for MCS pilot signals in base station apparatus under the wireless communication system of the third embodiment.

Base station apparatus 49 of the present embodiment has the function of selecting the modulation scheme according to error detection CRC (Cyclic Redundancy Check) results from mobile station apparatus 99. As shown in FIG. 17, base station apparatus 49 comprises CRC assigner 150-CRC assigner 153 that attach CRC codes to each MCS pilot signal that is output from MCS pilot signal output 69 and that corresponds to respective modulation schemes, and MCS pilot channel generator 149 that further comprises encoder 155-encoder 158 that perform the error correction coding (ECC: Error Correction Code) of outputs from respective CRC assigner 150-CRC assigner 153. FIG. 19 shows a transmission format for error-correction coded MCS pilot signals, which are output from each of encoder 155-encoder 158, and the configuration shown is such that a CRC and an ECC are appended to an MCS pilot signal.

Meanwhile, mobile station apparatus 99 of the present embodiment has the function of reporting to base station apparatus 49 the CRC determination result of the received data demodulated by the respective demodulation schemes in an ACK signal. As shown in FIG. 18, mobile station apparatus 99 comprises error correction demodulator 170-error correction demodulator 173 that perform the error correction modulation of outputs from respective demodulator 125-demodulator 128, and MCS pilot channel demodulator 169 that further comprises CRC determination unit 175-CRC determination unit 178 that make CRC (error detection) determinations of outputs from respective error correction demodulator 170-error correction demodulator 173 and output the results. The CRC determination results from CRC determination unit 175-CRC determination unit 178 are reported to base station apparatus 49.

From mobile station apparatus 99, the CRC determination results of received data modulated by respective modulation schemes are reported to base station apparatus 49 as an ACK signal. This report is made in the same manner as in Embodiment 1, except that "Reception result" in FIG. 8 has to be replaced by "CRC determination result." With the CRC determination result serving as a parameter, base station apparatus 49 selects the modulation scheme of the optimum modulation level with a good CRC determination result, and reports to mobile station apparatus 99 the modulation scheme to switch to and the timing to switch. In addition, it is also possible to average momentary CRC determination results over several slots and use the average CRC determination result as a parameter for modulation scheme selection.

As described above, according to the present embodiment, base station apparatus 49 assigns a CRC code to MCS pilot signals that correspond to respective modulation schemes and performs error correction encoding, and sends the result to mobile station apparatus 99. Mobile station apparatus 99 makes CRC determinations in respect to the MCS pilot signals after despreading and error correction decoding processing, and sends the result to base station apparatus 49. Based on the CRC determination result from mobile station apparatus 99, base station apparatus 49 selects the modulation scheme. By this means, the same advantage is achieved as by Embodiment 1.

Embodiment 4

Figure 20:
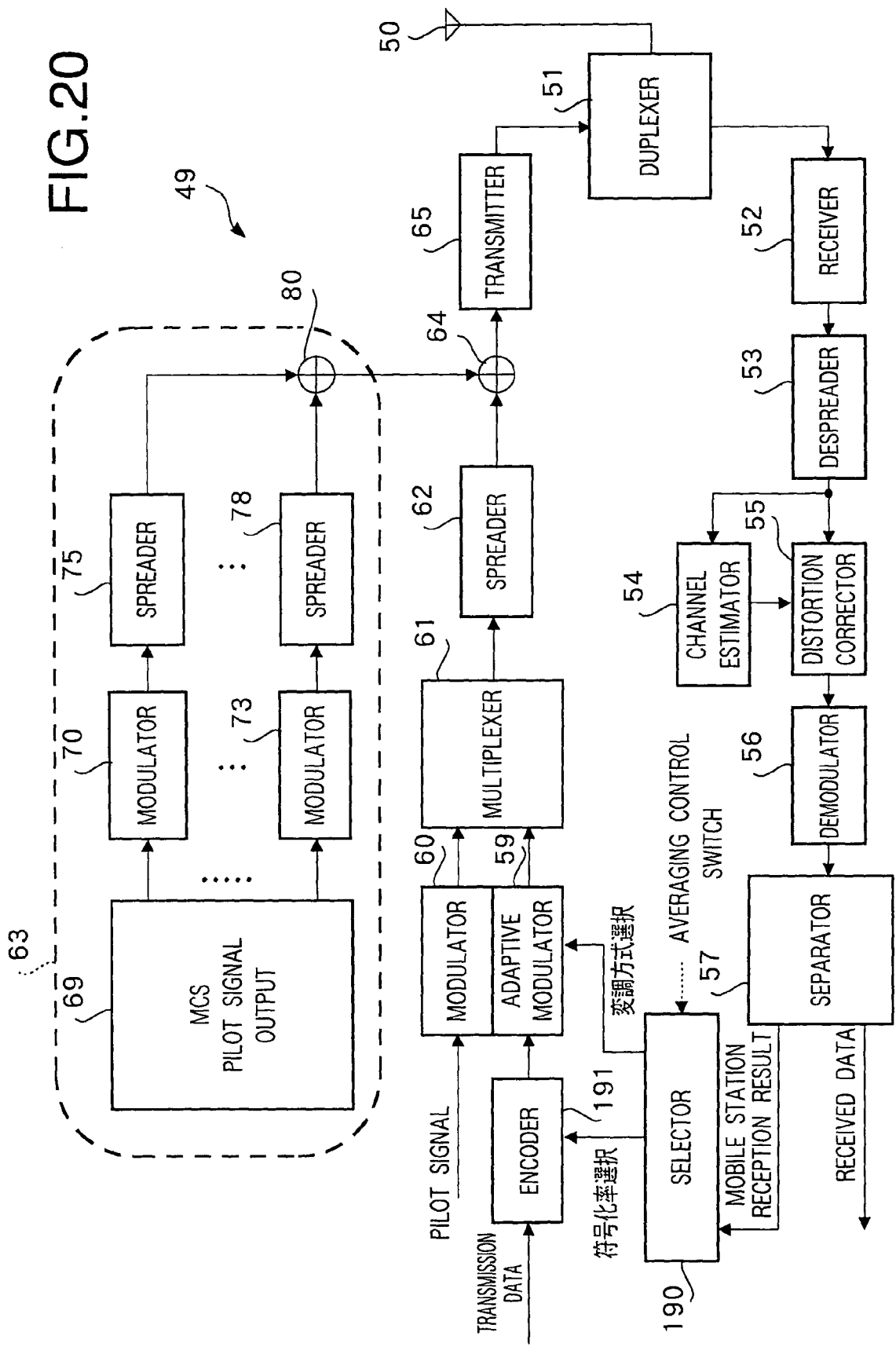
FIG. 20 is a block diagram showing a configuration of base station apparatus under the wireless communication system of the fourth embodiment of the present invention.
Figure 21:
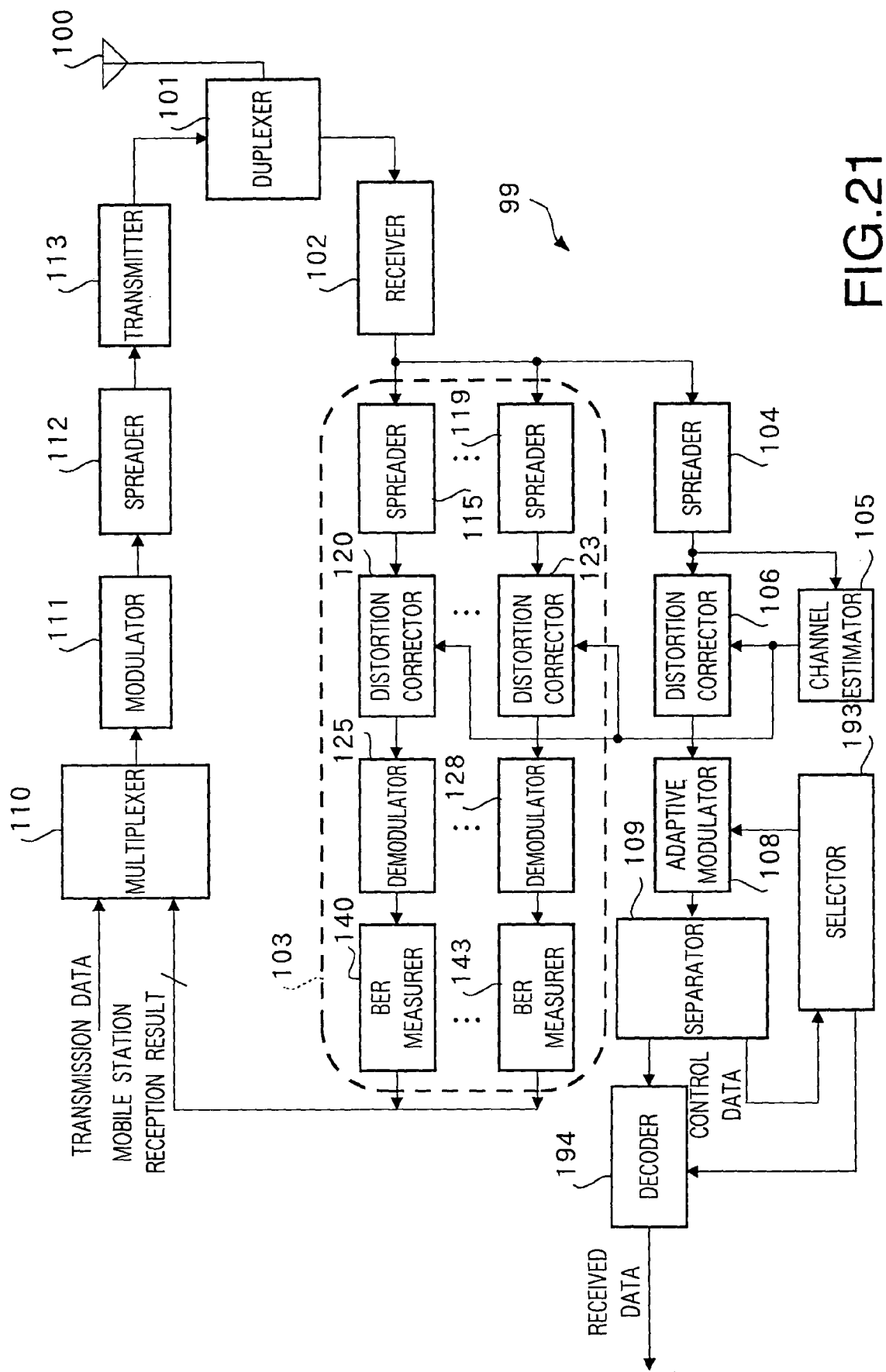
FIG. 21 is a block diagram showing a configuration of mobile station apparatus under the wireless communication system of the fourth embodiment.

FIG. 20 is a block diagram showing a configuration of base station apparatus under the wireless communication system of the fourth embodiment of the present invention. FIG. 21 is a block diagram showing a configuration of mobile station apparatus under the wireless communication system of the fourth embodiment. Parts in these figures identical to those of base station apparatus 49 of FIG. 5 and mobile station apparatus 99 of FIG. 6 are assigned the same numerals without further explanations. As for the numerals assigned to the base station apparatus and the mobile station terminal apparatus, the base station apparatus is "49" and the mobile station apparatus is "99," as in Embodiment 1.

Base station apparatus 49 of the present embodiment has the function of selecting the coding rate in error detection coding in accordance with the condition of reception in mobile station apparatus 99. As shown in FIG. 20, base station apparatus 49 comprises selector 190 that selects the modulation scheme and coding rate based on mobile station reception result, and encoder 191 that performs the error correction coding of transmission data according to the result of the coding rate selection from selector 190. The transmission data error-correction coded in encoder 191 is input into adaptive modulator 59.

Mobile station apparatus 99 of the present embodiment has the function of performing error correction coding based on the coding rate selected in base station apparatus 49. As shown in FIG. 21, mobile station apparatus 99 comprises selector 193 that selects the coding rate and demodulation scheme according to the control data isolated in separator 109, and decoder. 194 that performs the error correction decoding of received data at the coding rate selected in selector 193.

Selector 193 of base station apparatus 49 is provided with an error correction coding rate and modulation scheme selection table that lists corresponding error correction coding rates and modulation schemes in the form of a table, with reference to which the error coding rate and the modulation scheme are selected. FIG. 22 shows an example of a table of corresponding bit error rates, coding rates, and modulation schemes.

Base station apparatus 49 receives from mobile station apparatus a report on the number of bit errors, and thus obtains the bit error rate. Based on the bit error rate obtained, the coding rate and modulation scheme are selected with reference to the table of corresponding bit error rates, coding rates, and modulation schemes shown in FIG. 22. Assume a case where the bit error rates of MCS pilot signals modulated by respective modulation schemes are:

$QPSK = 1.5 \times 10^{-3}$ $8PSK = 4.0 \times 10^{-3}$ $16QAM = 1.5 \times 10^{-2}$ $64QAM = 2.0 \times 10^{-1}$ Referring to the above table of corresponding bit error rates, coding rates, and modulation schemes, the modulation scheme of 16QAM and the coding rate of ½ are selected.

Figure 23:
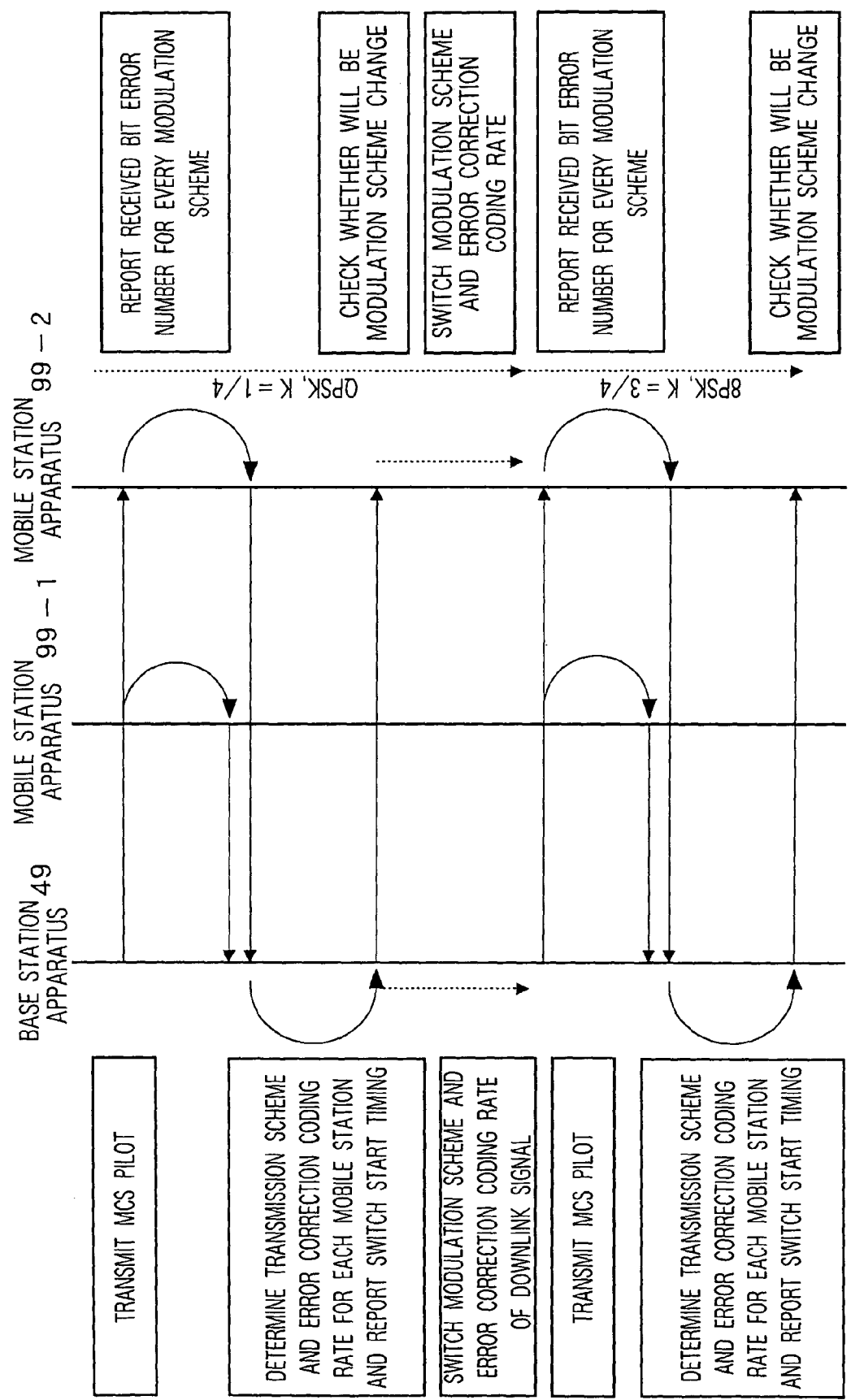
FIG. 23 is a sequence diagram showing the process of changing transmission rate between wireless communication apparatus and base station apparatus under the wireless communication system of the fourth embodiment.

FIG. 23 is a sequence diagram showing the process of changing the transmission rate between wireless communication apparatus and base station apparatus under the wireless communication system of the fourth embodiment. Referring to this figure, when an MCS pilot signal transmitted from base station apparatus 49 is received in mobile station apparatus 99-1 and in mobile station apparatus 99-2, mobile station apparatus 99-1 and in mobile station apparatus 99-2 draw a comparison with a known symbol pattern for every modulation scheme's MCS pilot signal, and reports the number of bit errors under each modulation scheme to base station apparatus 49. Assume that the initial modulation scheme for mobile station apparatus 99-1 and mobile station apparatus 99-2 is QPSK with the coding rate K of ¼.

Upon receiving from mobile station apparatus 99-1 and mobile station apparatus 99-2 the report on bit error numbers under the respective modulation schemes, base station apparatus 49 obtains the bit error rates from the reported bit error numbers, and selects the modulation schemes and the error correction coding rates for mobile station apparatus 99-1 and mobile station apparatus 99-2 from the table of corresponding bit error rates, coding rates, and modulation schemes (see FIG. 22). Then, the selected modulation schemes, error correction coding rates, and the timings to start switching these are reported to mobile station apparatus 99-1 and mobile station apparatus 99-2. Upon receiving this report from base station apparatus 49, mobile station apparatus 99-1 and mobile station apparatus 99-2 determine, based on the report, as to whether or not the modulation schemes need to be switched.

When the timing reported to mobile station apparatus 99-1 and mobile station apparatus 99-2 to start performing the switch comes, base station apparatus 49 switches the modulation scheme and the error correction coding rate. Mobile station apparatus 99-1 and mobile station apparatus 99-2 also switch the modulation scheme and error correction coding rate by the specified timing. For instance, if the modulation scheme of the maximum receivable modulation level for mobile station apparatus 99-1 and mobile station apparatus 99-2 is 8PSK and the error correction coding rate K is ¾ according to a reception result reported from mobile station apparatus 99-1 and mobile station apparatus 99-2, the current QPSK with K=¼ switches to 8PSK with K=¾.

After having thus switched the modulation scheme and error correction coding rate, base station apparatus 49 once again transmits MCS pilot signals and performs the same processings as above in relationship to mobile station apparatus 99-1 and mobile station apparatus 99-2. On the other hand, when there is no need to switch the current modulation scheme and error correction coding rate, MCS pilot signals are transmitted by the same timing as the switch-start timing. That is, MCS pilot signals are transmitted on a given interval, and a determination is made as to whether the modulation scheme and error correction coding rate needs to be switched. If such change is needed, the modulation scheme and error correction coding rate switch to new ones, and if such change is not needed, the present modulation scheme and error correction coding rate are sustained until the next MCS pilot signals are transmitted.

As described above, according to the present embodiment, mobile station apparatus 99 obtains the number of bit errors from the demodulation result of MCS pilot signals, and sends this result to base station apparatus 49. Base station apparatus 49 obtains the bit error rate from the bit error number from mobile station apparatus 99, and selects, according to the obtained bit error rate, and the coding rate in error correction coding for the downlink signals. By this means, data reception at the optimum transmission rate is possible.

Although the present embodiment above is configured such that the number of bit errors is used as the information on mobile station reception result from mobile station apparatus 99, the bit error rate, CRC determination result, result of match/nonmatch between MCS pilot signals and known symbol patterns, and various others can be used as well.

Moreover, as described in Embodiment 2, the coding rate in error correction coding does not need to be selected based on the bit error rates under modulation schemes that correspond to respective MCS pilot signals, and it is possible to select the error coding rate in error correction coding based on the bit error rate of minimum one modulation scheme. Focusing on QPSK, for instance, when the bit error rate is $6.5 \times 10^{-4}$, this falls below $9.0 \times 10^{-4}$ according to the table of FIG. 22, and so 16QAM with the coding rate of ¾ is selected. By thus looking at minimum one MCS pilot signal utilizing a modulation scheme, the process can be simplified and the number of MCS pilot transmission patterns can be reduced, for simplified transmission circuit and reduced inter-code interference.

Incidentally, the present embodiment allows the use of one slot of ACK signal from each mobile station apparatus 99 for a parameter. It is also possible to average several slots of ACK signals and use the average ACK signal as a parameter. Referring to FIG. 20, the signal noted as "AVERAGING CONTROL SWITCH" indicates the average of several slots, and when this "AVERAGING CONTROL SWITCH" signal is input, selector 190 averages several slots of ACK signals from mobile station apparatus 99, and, with the averaged ACK signal serving as a parameter, selects the coding rate in error correction decoding and the modulation scheme.

Embodiment 5

Figure 24:
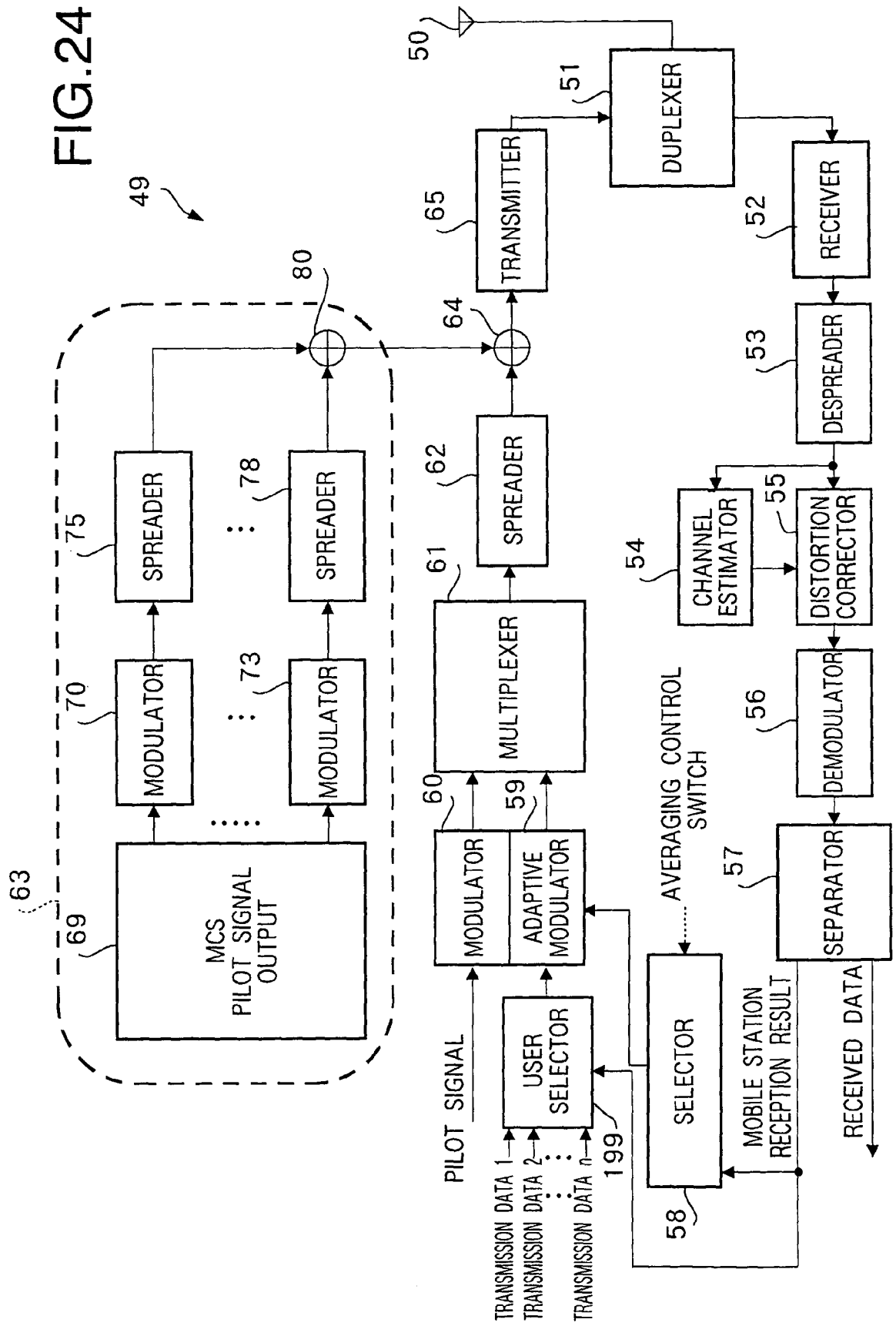
FIG. 24 is a block diagram showing a configuration of base station apparatus under the wireless communication system of the fifth embodiment of the present invention.

FIG. 24 is a block diagram showing a configuration of base station apparatus under the wireless communication system of the fifth embodiment of the present invention. Parts in this figure identical to those in base station apparatus 49 of FIG. 5 are assigned the same codes without further explanations. The numeral assigned for the base station apparatus will be "49" as in Embodiment 1. As for the mobile station apparatus, reference will be made to FIG. 5.

Base station apparatus 49 of the present embodiment has the function of packet scheduling based on bit error rate. Mobile station apparatus 99 obtains the numbers of bit errors by comparing MCS pilot signals demodulated by respective modulation schemes with known symbol patterns, and reports the result to base station apparatus 49. In user selector (packet scheduler) 199, base station apparatus 49 receives the report on the number of bit errors and obtains the bit error rate, and this bit error rate is memorized for every mobile station apparatus 99. Then of those mobile station apparatus 99's transmitting unempty packet data, transmission data 1, 2, . . . n are distributed to users in the order of mobile station apparatus 99's giving good error rates.

Thus according to the present embodiment, packet scheduling is performed based on modulation performance of mobile station apparatus 99, and high priority is assigned to those mobile station apparatus 99 of high success rates of reception, so that retransmission due to transmission errors can be reduced for improved throughput.

Embodiment 6

Figure 25:
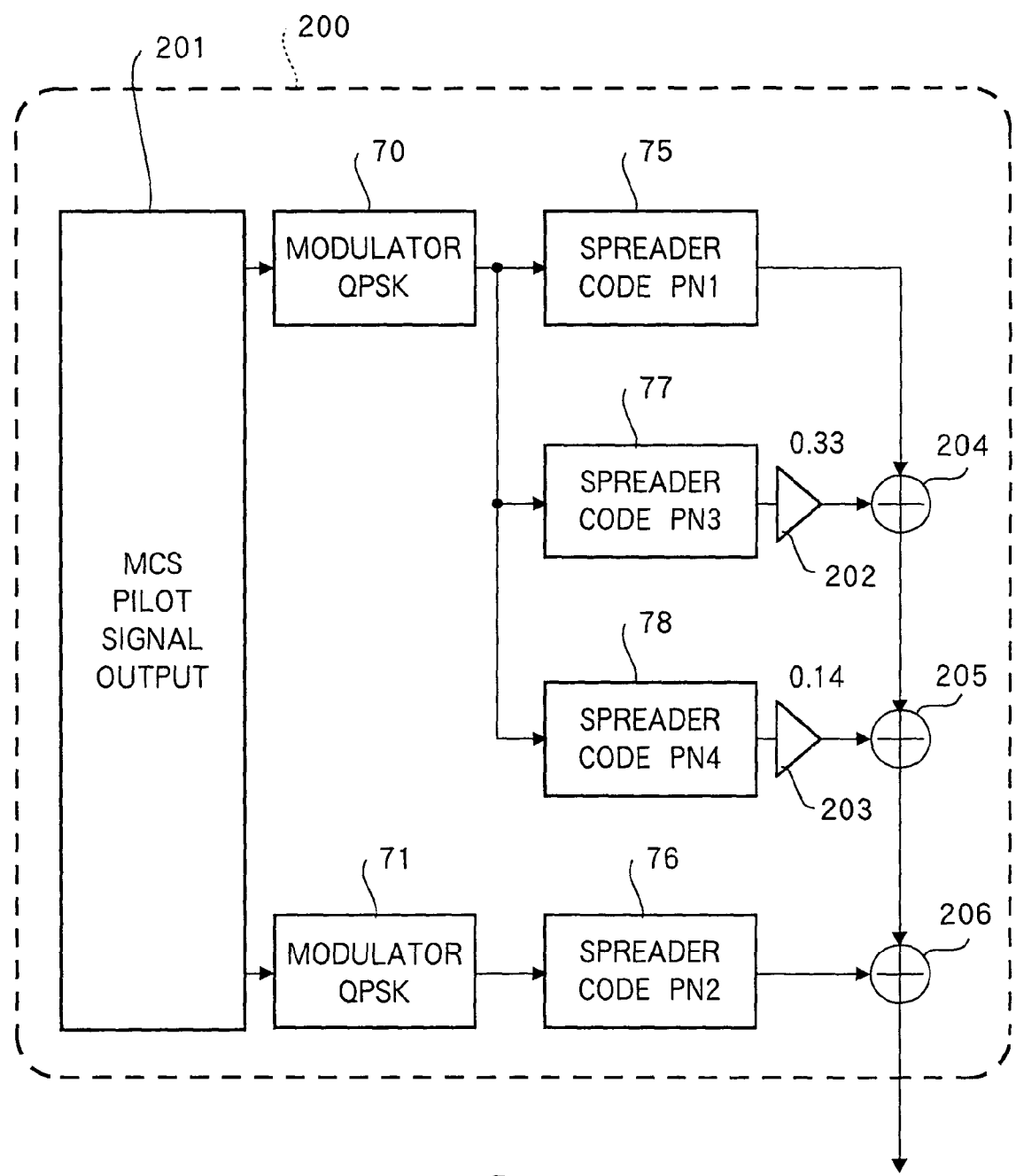
FIG. 25 is a block diagram showing a configuration of MCS pilot channel generator in base station apparatus under the wireless communication system of the sixth embodiment of the present invention.

FIG. 25 is a block diagram showing a configuration of MCS pilot channel generator 200 in base station apparatus under the wireless communication system of the sixth embodiment of the present invention. Parts in this figure identical to those of MCS pilot channel generator 63 of FIG. 5 are assigned the same codes without further explanations. As for parts besides MCS pilot channel generator 200, reference will be made to FIG. 5. Moreover, the numerals assigned to the base station apparatus and the mobile station terminal apparatus will be "49" for the base station apparatus and "99" for the mobile station apparatus, as in Embodiment 1.

Figure 26:
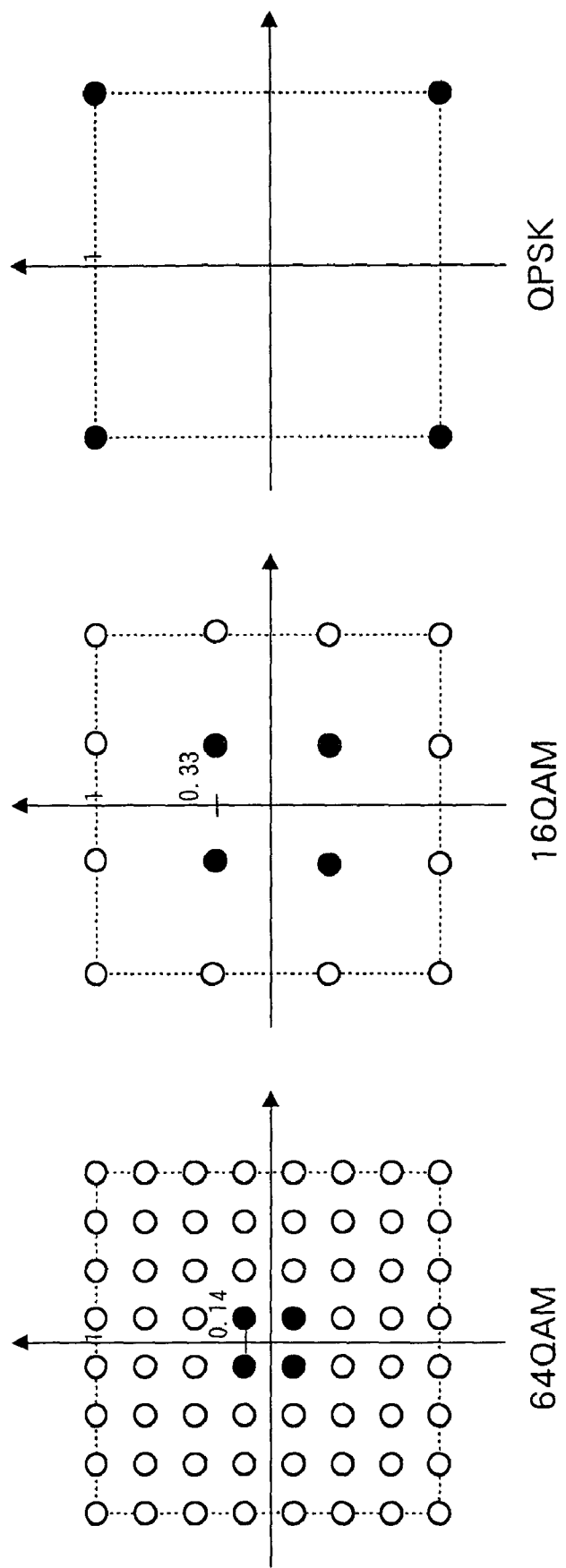
FIG. 26 is for explaining the function of MCS pilot channel generator in base station apparatus under the wireless communication system of the sixth embodiment.

When MCS pilot signals of the respective modulation schemes of 64QAM, 16QAM, and QPSK are multiplexed, provided a configuration shown in FIG. 26 where the four nearest points to the origin are transmitted as MCS pilot signals, QPSK can generate dummy MCS pilot signals of 16QAM and 64QAM by only changing the output amplitude, thereby simplifying the MCS pilot channel generator. As shown in FIG. 25, as for an MCS pilot signal of QPSK, a signal from spreader 75 is output as it is, while for an MCS pilot signal of 16QAM, a signal from spreader 77 is adjusted in amplifier 202 from the output level of spreader 75 to the output level of 16QAM (specifically, 0.33 times). As for an MCS pilot signal of 64QAM, a signal from spreader 78 is adjusted in amplifier 203 from the output level of spreader 75 to the output level of 64QAM (specifically, 0.14 times)

Output from spreader 75 and output from amplifier 202 are added in adder 204, while output from adder 204 and output from amplifier 203 are added in adder 205. As for an MCS pilot signal by 8PSK, modulator 71 and spreader 78 dedicated thereto are provided, so that output from spreader 76 and output from adder 205 are added in adder 206.

As described above, the present embodiment is configured such that in base station apparatus 49, MCS pilot signals respectively corresponding to 16QAM and 64QAM are fictitiously generated from demodulated MCS pilot signals corresponding to QPSK, so that modulators for 16QAM and 64QAM become unnecessary, and cost reduction is possible.

Figure 27:
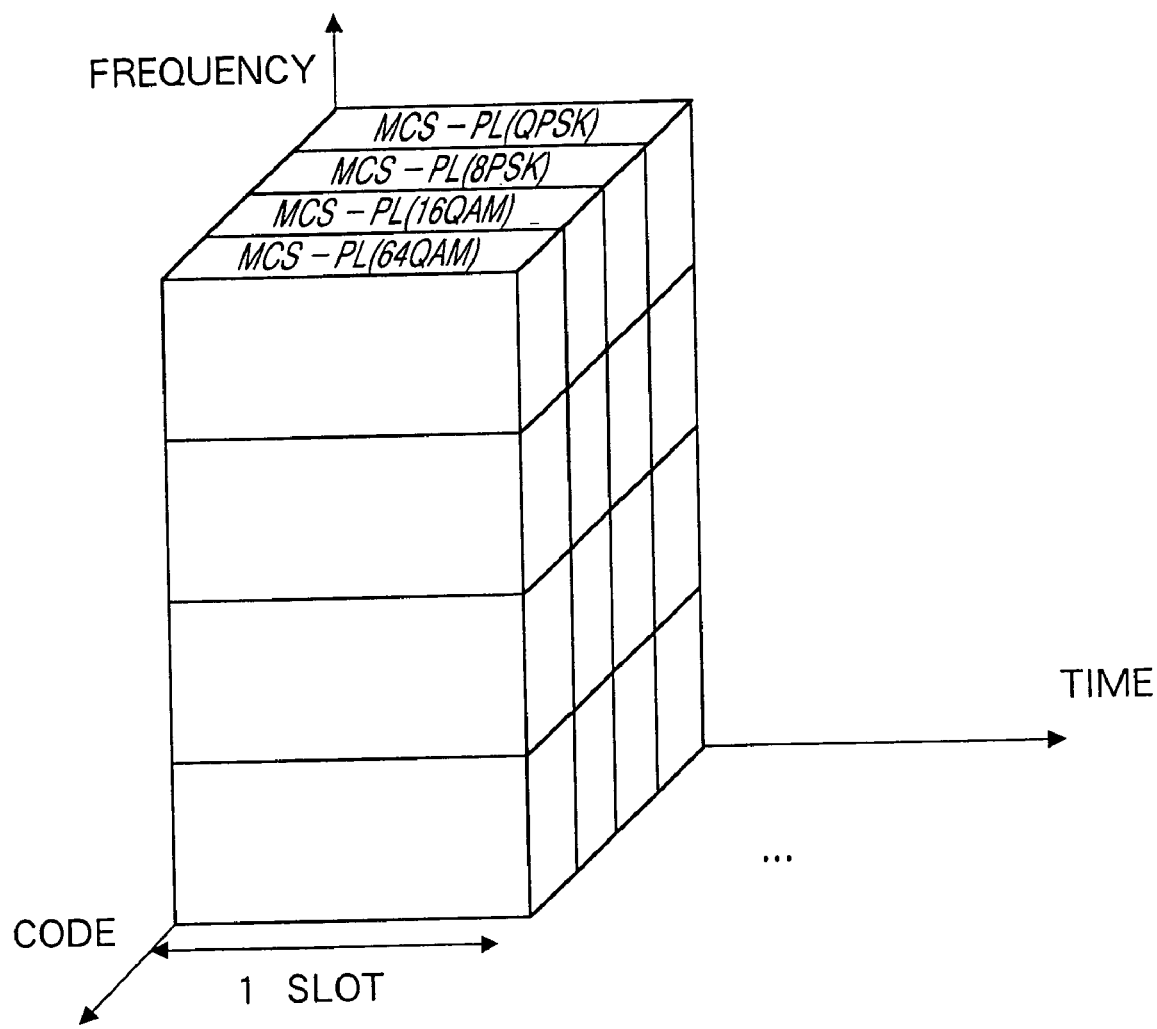
FIG. 27 is a conceptual diagram of transmission pattern for MCS pilot channel signals where the present invention is employed in multicarrier communication scheme of the frequency direction.

Furthermore, by applying frequency-directional multicarrier communications scheme to each of the above embodiments, MCS pilot signals can be sent in parallel also in the frequency direction as shown in FIG. 27, so that the time to transmit MCS pilot signals can be reduced.

As explained above, the present invention provides wireless communication systems whereby the modulation schemes can be switched accurately and easily without wasting radio resources.

The present application is based on Japanese Patent Application No.2001-214531 filed on Jul. 13, 2001, entire content of which is incorporated herein for reference.

INDUSTRIAL APPLICABILITY

The present invention is applicable to mobile communication systems for mobile telephones.

The invention claimed is:

1. A base station apparatus comprising:
a pilot signal outputter that outputs, at the same time, all of a plurality of dedicated pilot signals respectively corresponding on a one-to-one basis to a plurality of different modulation schemes;
a modulator that modulates, separately from transmission data, all of the plurality of dedicated pilot signals, output by the pilot signal outputter, using the modulation schemes respectively corresponding on the one-to-one basis to the dedicated pilot signals;
a multiplexer that spreads and code multiplexes all of the dedicated pilot signals, modulated by the modulator, using spreading codes respectively corresponding on a one-to-one basis to the modulation schemes to produce spread and code multiplexed dedicated pilot signals; and
a transmitter that transmits the spread and code multiplexed dedicated pilot signals as a multiplex signal.

2. The base station apparatus according to claim 1, further comprising:
a receiver that receives from a mobile station apparatus a mobile station reception result indicating whether all of the dedicated pilot signals in the multiplex signal are each received successfully; and
a modulation scheme selector that selects a modulation scheme of an optimum M-ary modulation number from modulation schemes corresponding to dedicated pilot signals that are successfully received according to the mobile station reception result.

3. The base station apparatus according to claim 2, wherein, when the mobile station reception result indicates whether all of the dedicated pilot signals match with known symbol patterns respectively corresponding to all of the dedicated pilot signals, the modulation scheme selector selects the modulation scheme of the optimum M-ary modulation number from modulation schemes corresponding to dedicated pilot signals matching with the known symbol patterns.

4. The base station apparatus according to claim 2, wherein, when the mobile station reception result indicates the number of bit errors acquired from comparison of all of the dedicated pilot signals and known symbol patterns respectively corresponding to all of the dedicated pilot signals, the modulation scheme selector selects the modulation scheme of the optimum M-ary modulation number from modulation schemes that the mobile station is capable of receiving, based on a bit error rate obtained by dividing the number of bit errors by the number of transmission bits.

5. The base station apparatus according to claim 2, wherein, when the mobile station reception result indicates a bit error rate acquired from comparison of at least one of the plurality of dedicated pilot signals and a known symbol pattern corresponding to the one dedicated pilot signal, the modulation scheme selector refers to a correspondence table showing a plurality of respectively corresponding modulation schemes and bit error rates, and selects the modulation scheme of the optimum M-ary modulation number from the modulation schemes that the mobile station is capable of receiving.

6. The base station apparatus according to claim 2, further comprising:
an error correction coder that performs error detection and error correction coding processing on each of the plurality of dedicated pilot signals, wherein
when the mobile station reception result indicates an error detection determination result of the plurality of dedicated pilot signals after the error detection and the error correction coding processing, the modulation scheme selector selects the modulation scheme of the optimum M-ary modulation number, based on the error detection determination result.

7. The base station apparatus according to claim 2, wherein the modulation scheme selector selects the modulation scheme and selects a coding rate for error correction coding of a downlink signal.

8. The base station apparatus according to claim 1, wherein the pilot signal outputter outputs a dedicated pilot signal corresponding to a modulation scheme other than a modulation scheme of a minimum M-ary modulation number.

9. The base station apparatus according to claim 2, further comprising a packet scheduler that memorizes the mobile station reception result from every mobile station apparatus and performs packet scheduling for mobile station apparatuses transmitting nonempty packets corresponding to good mobile station reception results.

* * * * *